US011418612B2

(12) United States Patent
Uchida

(10) Patent No.: US 11,418,612 B2
(45) Date of Patent: Aug. 16, 2022

(54) INFORMATION PROCESSING DEVICE, INFORMATION PROCESSING METHOD, PROGRAM, AND STORAGE MEDIUM FOR TRANSMITTING INFORMATION TO A TERMINAL DEVICE IRRESPECTIVE OF STATE TRANSMITIONING OF THE TERMINAL DEVICE

(71) Applicant: Rakuten Group, Inc., Tokyo (JP)

(72) Inventor: Yuki Uchida, Tokyo (JP)

(73) Assignee: Rakuten Group Inc., Tokyo (JP)

( * ) Notice: Subject to any disclaimer, the term of this patent is extended or adjusted under 35 U.S.C. 154(b) by 309 days.

(21) Appl. No.: 16/607,456

(22) PCT Filed: May 31, 2018

(86) PCT No.: PCT/JP2018/020979
§ 371 (c)(1),
(2) Date: Oct. 23, 2019

(87) PCT Pub. No.: WO2019/229935
PCT Pub. Date: Dec. 5, 2019

(65) Prior Publication Data
US 2021/0368016 A1 Nov. 25, 2021

(51) Int. Cl.
*G06F 15/16* (2006.01)
*H04L 67/55* (2022.01)
*H04L 67/141* (2022.01)

(52) U.S. Cl.
CPC ............ *H04L 67/26* (2013.01); *H04L 67/141* (2013.01)

(58) Field of Classification Search
CPC ..... H04L 67/26; H04L 67/141; H04L 67/142; H04L 67/143
(Continued)

(56) References Cited

U.S. PATENT DOCUMENTS

2007/0299918 A1* 12/2007 Roberts ................ G06Q 10/107
709/206
2014/0201353 A1* 7/2014 Poe ..................... H04L 43/0811
709/224
(Continued)

FOREIGN PATENT DOCUMENTS

JP 2008-269588 A 11/2008

OTHER PUBLICATIONS

International Search Report for PCT/JP2018/020979 dated Aug. 21, 2018 [PCT/ISA/210].

*Primary Examiner* — Kaylee J Huang
(74) *Attorney, Agent, or Firm* — Sughrue Mion, PLLC

(57) ABSTRACT

In a state where a communication session between a terminal device and a mediating unit is established, an information processing device transmits information in accordance with a processing request generated by the mediating unit based on input data of the terminal device so that an output based on the transmitted information is performed in the terminal device. The information processing device receives the processing request from the mediating unit, obtains guide information in accordance with the processing request, and intermittently and sequentially transmits a plurality of pieces of process information and, in a case where the communication session is disconnected before transmission of all the process information is completed, transmits information for executing an output in accordance with a transmission situation of process information when the communication session is disconnected to the terminal device.

12 Claims, 18 Drawing Sheets

(58) Field of Classification Search
USPC .................................. 709/217, 219, 203, 226
See application file for complete search history.

(56) References Cited

U.S. PATENT DOCUMENTS

| | | | |
|---|---|---|---|
| 2015/0067788 A1* | 3/2015 | Hong ..................... | H04L 63/08 726/4 |
| 2015/0365217 A1* | 12/2015 | Scholten ............... | H04L 5/0053 370/315 |
| 2016/0094618 A1* | 3/2016 | De Magalhaes ...... | G06F 16/951 709/203 |
| 2016/0360039 A1* | 12/2016 | Sanghavi ............ | H04M 3/5166 |
| 2019/0082486 A1* | 3/2019 | Jeong .................... | H04L 67/141 |
| 2019/0311647 A1* | 10/2019 | Shete ..................... | G09B 19/00 |
| 2020/0098367 A1* | 3/2020 | Shin ..................... | H04L 12/282 |

* cited by examiner

FIG. 4

CONTENT DB 4

| ID | FOOD NAME | INGREDIENTS INFORMATION | PROCESS INFORMATION |
|---|---|---|---|
| 0000001 | NIKUJAGA | POTATO (3), ONION (1/2), ... | CUT VEGETABLE, BEEF, AND SIMILAR INGREDIENTS (10 MINUTES), ADD STOCK AND STEW (20 MINUTES), ... |
| 0000002 | CURRY RICE | ONION (2), CARROT (1), ... | CUT ONION, CARROT...INTO BITE SIZE PIECES (10 MINUTES), ... |
| 0000003 | FRIED VEGETABLE | PORK RIB (150 GRAMS), BEAN SPROUT (100 GRAMS), ... | HEAT FRYING PAN AND FRY PORK RIB (5 MINUTES), ... |
| ... | ... | ... | ... |

INFORMATION PROCESSING DEVICE, INFORMATION PROCESSING METHOD, PROGRAM, AND STORAGE MEDIUM FOR TRANSMITTING INFORMATION TO A TERMINAL DEVICE IRRESPECTIVE OF STATE TRANSMITIONING OF THE TERMINAL DEVICE

CROSS REFERENCE TO RELATED APPLICATIONS

This application is a National Stage of International Application No. PCT/JP2018/020979 filed May 31, 2018.

TECHNICAL FIELD

The present invention relates to an information processing device, an information processing method, a program, and a storage medium, in particular, a technical field regarding a provision of information in order to assist operations of a user.

BACKGROUND ART

In recent years, there has existed an application (hereinafter also described as an assistant application) that has an assistant function operable by voice input. A user can obtain various kinds of information from this application by performing an input operation by, for example, voice into a terminal device including the assistant application.

Patent Literature 1 discloses a recognition device that presents advice data effective for assisting cooking operations, corresponding to a menu selected by a user. The advice data is, for example, recipe information corresponding to the menu and information on cooking appliances. The advice data is presented by moving image, character information, and voice information that reads out character information by voice.

CITATION LIST

Patent Literature

Patent Literature 1: JP 2008-269588 A

SUMMARY OF INVENTION

Technical Problem

In such an assistant application, a session is established with an assistant server that assists the application when the application is activated. The assistant application can communicate with a providing server having information necessary for a user via the assistant server.

Here, a terminal device including the assistant application is found in many cases that it is set to go into a sleep state when a certain period of time elapses, from the aspect of power-saving or similar reasons. At this time, the terminal device is set to go into a lock state from the aspect of crime prevention.

When the terminal device goes into the sleep state, processing of the assistant application is interrupted, and the communication session between the application and the assistant server is disconnected. Therefore, the terminal device can no longer receive information from the providing server via the assistant server.

Therefore, the object of the present invention is to continuously provide predetermined information provided from a providing server to a user even when a terminal device goes into a lock state due to the terminal device transitioning into a sleep state.

Solution to Problem

An information processing device according to the present invention is an information processing device in a system in which, in a state where a communication session between a terminal device and a mediating unit is established, the information processing device transmits information in accordance with a processing request so that an output based on the transmitted information is performed in the terminal device. The processing request is generated by the mediating unit based on input data of the terminal device. The information processing device includes a request data receiving unit, a guide information obtaining unit, and an information transmitting unit. The request data receiving unit receives the processing request from the mediating unit. The guide information obtaining unit obtains guide information in accordance with the processing request. The guide information includes a plurality of pieces of process information. The information transmitting unit intermittently and sequentially transmits the plurality of pieces of process information and, in a case where the communication session is disconnected before transmission of all the process information in the guide information is completed, transmits, to the terminal device, information for executing an output in accordance with a transmission situation of the plurality of pieces of process information when the communication session is disconnected.

This transmits information from the information processing device to the terminal device even when the communication session between the terminal device and the mediating unit is disconnected in its course while the process information is being transmitted.

In the above-described information processing device, it is considered that the information transmitting unit intermittently and sequentially transmits the plurality of pieces of process information to the mediating unit in a state where the communication session is established.

With this, the information processing device transmits the process information to the terminal device via the mediating unit in the state where the communication session between the terminal device and the mediating unit is established.

In the above-described information processing device, it is considered that the information for executing the output is process information, and when an estimated time of the transmitted process information elapses, the information transmitting unit transmits next process information to the mediating unit in a state where the communication session is established, and transmits the next process information to the terminal device in a state where the communication session is disconnected.

This ensures continuously transmitting the process information from the information processing device to the terminal device even when the communication session between the terminal device and the mediating unit is disconnected in its course.

In the above-described information processing device, it is considered that the information transmitting unit transmits process information to the terminal device as a push notification in a state where the communication session is disconnected.

This ensures presenting the process information even when the terminal device is on a lock screen or the like.

In the above-described information processing device, it is considered that the information transmitting unit transmits, to the terminal device, the information for executing the output as information configured to be output by voice.

This ensures notifying the information regardless of whether the predetermined information is presented on a presentation screen of the terminal device or not.

In the above-described information processing device, it is considered that the information for executing the output is activation request information of the terminal device.

It is considered that the terminal device is in the sleep state in a state where the communication session between the terminal device and the mediating unit is disconnected in its course. Therefore, transmitting the activation request information of the terminal device when information is transmitted from the information processing device to the terminal device ensures receiving information while releasing the sleep state.

In the above-described information processing device, it is considered that the information for executing the output is alarm information, and the information transmitting unit transmits the alarm information to the terminal device in a case where the communication session is in a disconnected state when an estimated time of process information transmitted in a state where the communication session is established elapses.

This notifies that the estimated time of the process information has elapsed, and thus, the user of the terminal device is called for attention. Here, the estimated time means a time estimated to be necessary when the user performs operations based on the process information. The estimated time is set for each piece of process information.

In the above-described information processing device, it is considered that the information transmitting unit transmits alarm information to the terminal device again in a case where the communication session is in a disconnected state after a predetermined time elapses after transmitting alarm information to the terminal device.

This continuously calls the user for attention by alarm at each predetermined time.

In the above-described information processing device, it is considered that the information transmitting unit transmits alarm information to the terminal device. The alarm information causes sound to be produced with a larger volume in accordance with an increase in a transmitting number of the alarm information to the terminal device.

This makes it further easy to make the user recognize a situation of the terminal device by alarm tone.

In the above-described information processing device, it is considered that the information transmitting unit determines a state of the communication session depending on whether transmission of process information to the mediating unit has succeeded or not.

This ensures determining a state of the communication session between the terminal device and the mediating unit by whether the transmission of the process information to the mediating unit has succeeded or not without performing processing to confirm a state of the communication session again.

An information processing method according to the present invention is an information processing method in which an information processing device executes steps. The information processing device is in a system in which, in a state where a communication session between a terminal device and a mediating unit is established, the information processing device transmits information in accordance with a processing request so that an output based on the transmitted information is performed in the terminal device. The processing request is generated by the mediating unit based on input data of the terminal device. The information processing device executes a request data receiving step of receiving the processing request from the mediating unit, a guide information obtaining step of obtaining guide information in accordance with the processing request, the guide information including a plurality of pieces of process information, an information transmission step of intermittently and sequentially transmitting the plurality of pieces of process information and, in a case where the communication session is disconnected before transmission of all the process information in the guide information is completed, transmitting to the terminal device, information for executing an output in accordance with a transmission situation of the plurality of pieces of process information when the communication session is disconnected.

A program according to the present invention is a program that causes an information processing device to execute each processing of the above-described information processing method.

A storage medium according to the present invention is a storage medium that stores the above-described program.

These program and storage medium achieve the above-described information processing device.

Advantageous Effects of Invention

The present invention ensures continuously providing predetermined information to a user even when a terminal device goes into a sleep state.

BRIEF DESCRIPTION OF DRAWINGS

FIG. 4 is an explanatory diagram of an outline of a presentation screen on a user terminal of the embodiment.

6A and 6B are explanatory diagrams of the outline of the presentation screen on the user terminal of the embodiment.

7A and 7B are explanatory diagrams of the outline of the presentation screen on the user terminal of the embodiment.

8A and 8B are explanatory diagrams of the outline of the presentation screen on the user terminal of the embodiment.

Figure 9:
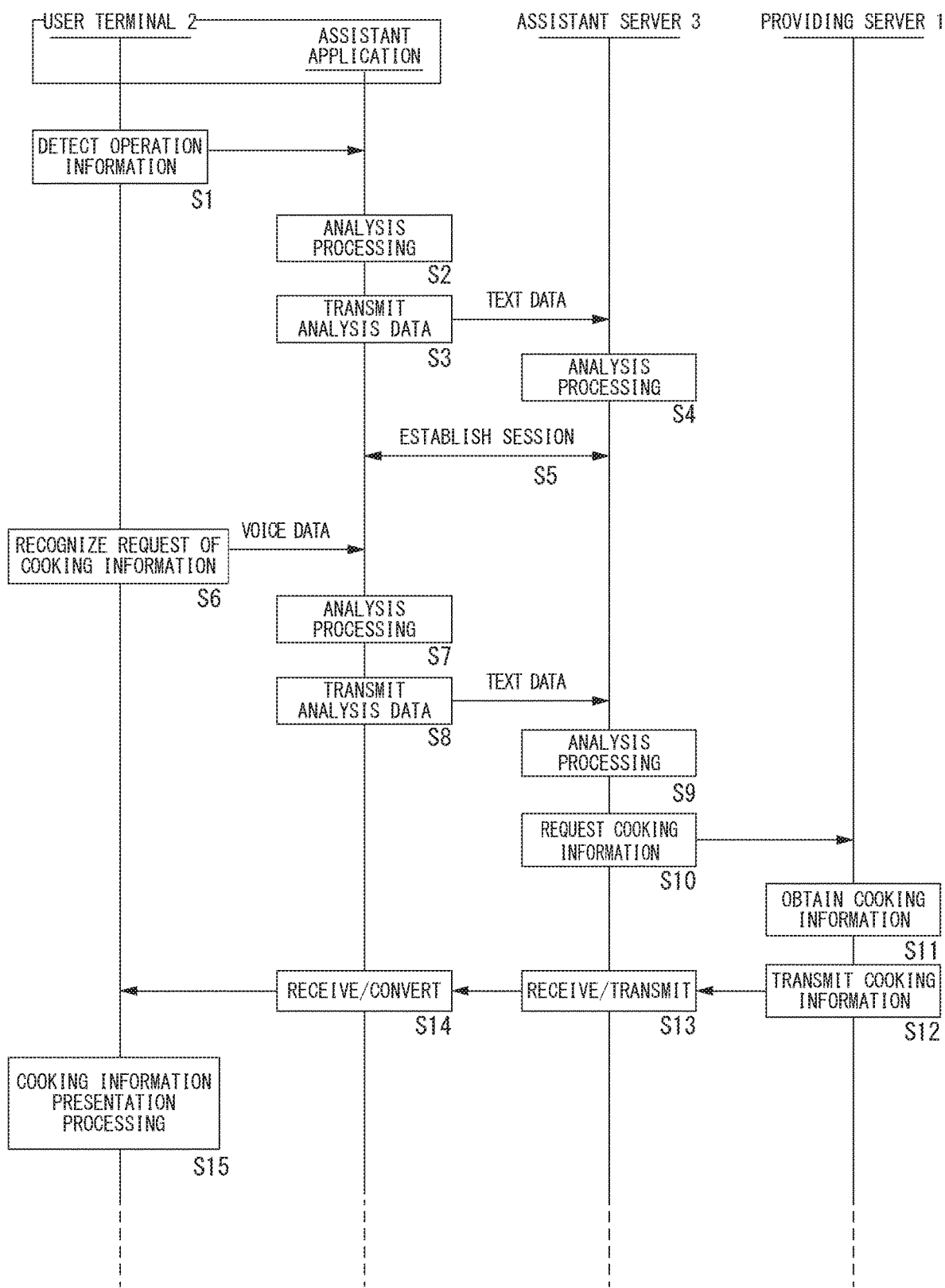

FIG. 9 is an explanatory diagram of a procedure of processing of a whole system of a first embodiment.

Figure 10:
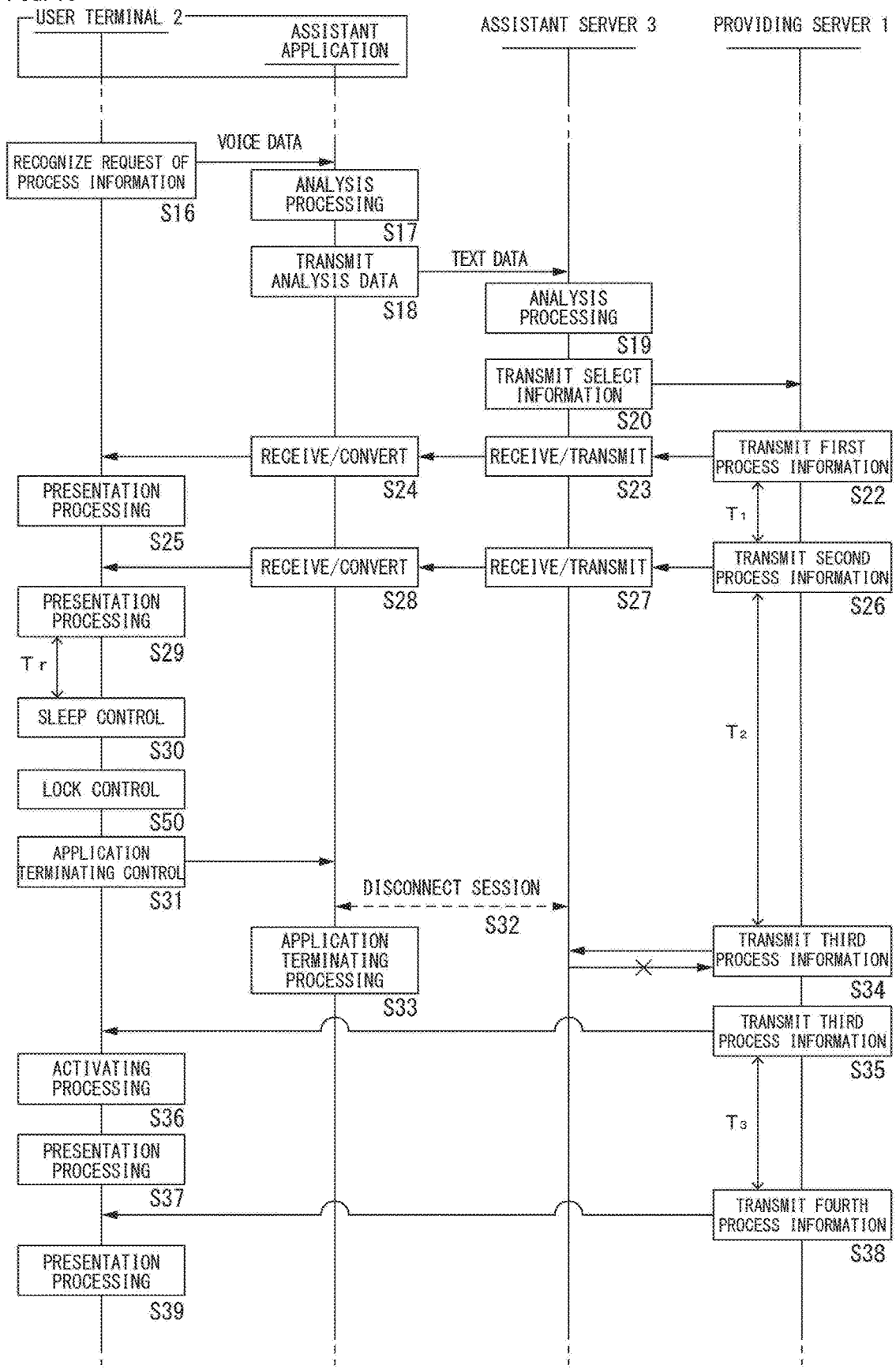

FIG. 10 is an explanatory diagram of the procedure of the processing of the whole system of the first embodiment.

Figure 11:
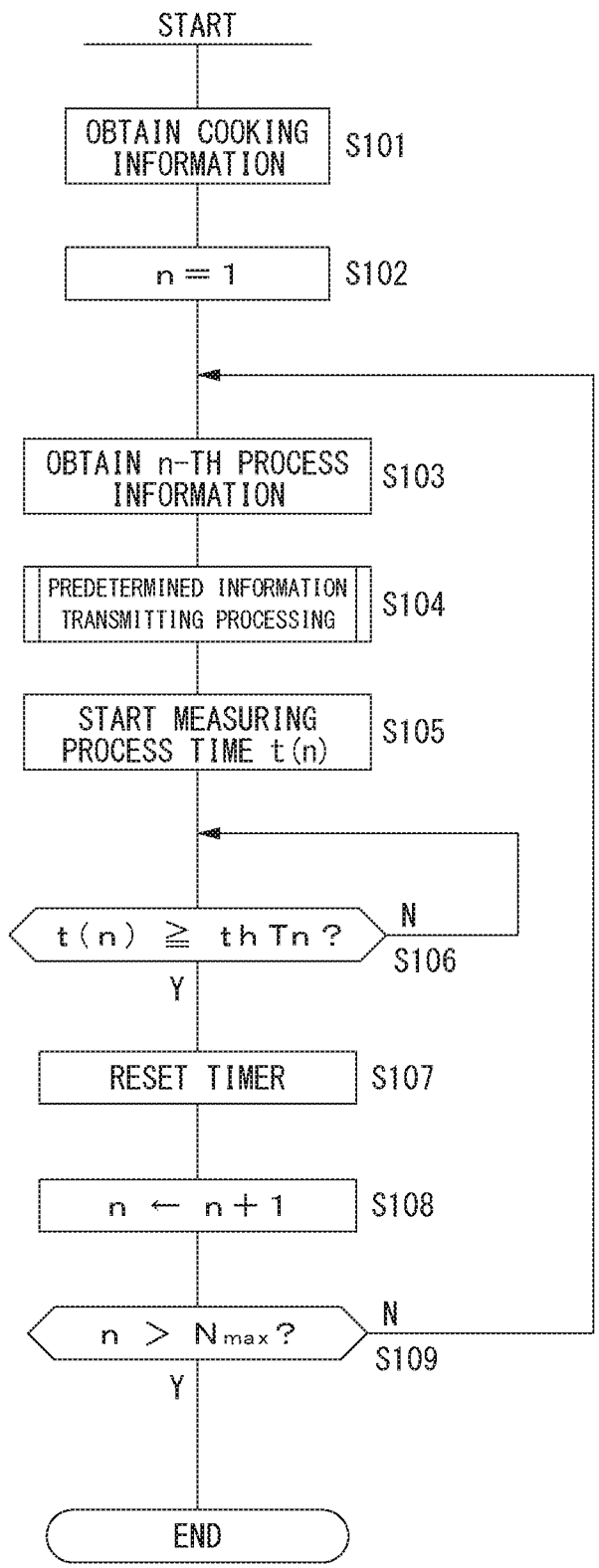

FIG. 11 is an explanatory diagram of a procedure of processing of a providing server of the first embodiment.

Figure 12:
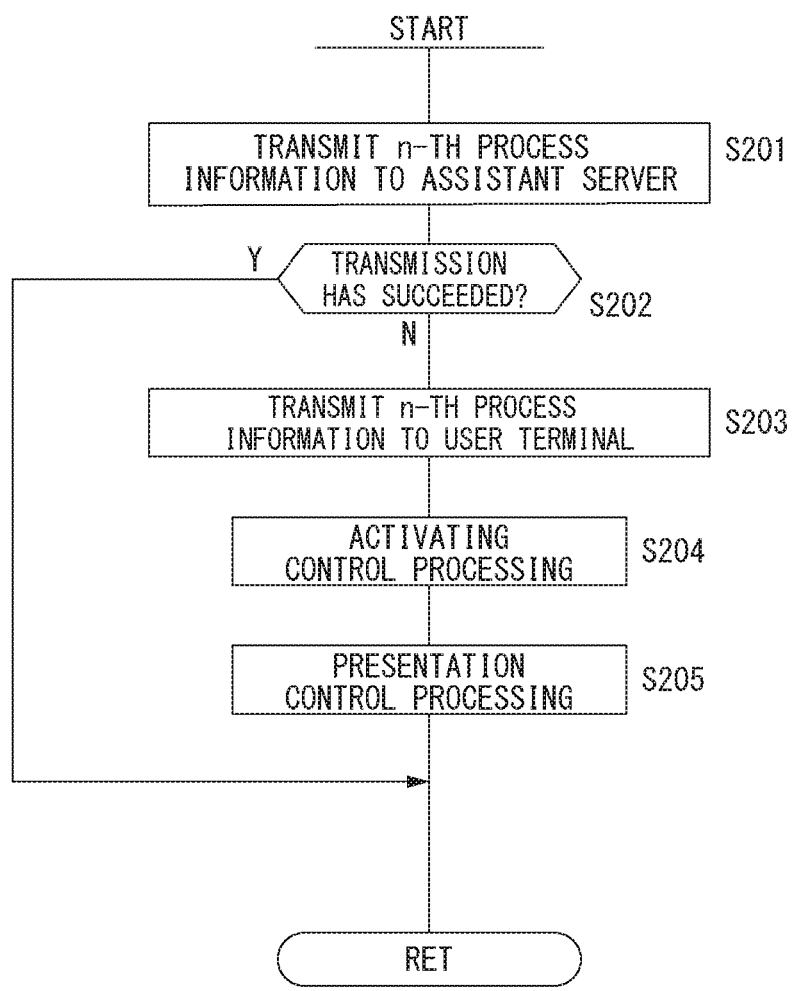

FIG. 12 is an explanatory diagram of the procedure of the processing of the providing server of the first embodiment.

Figure 13:
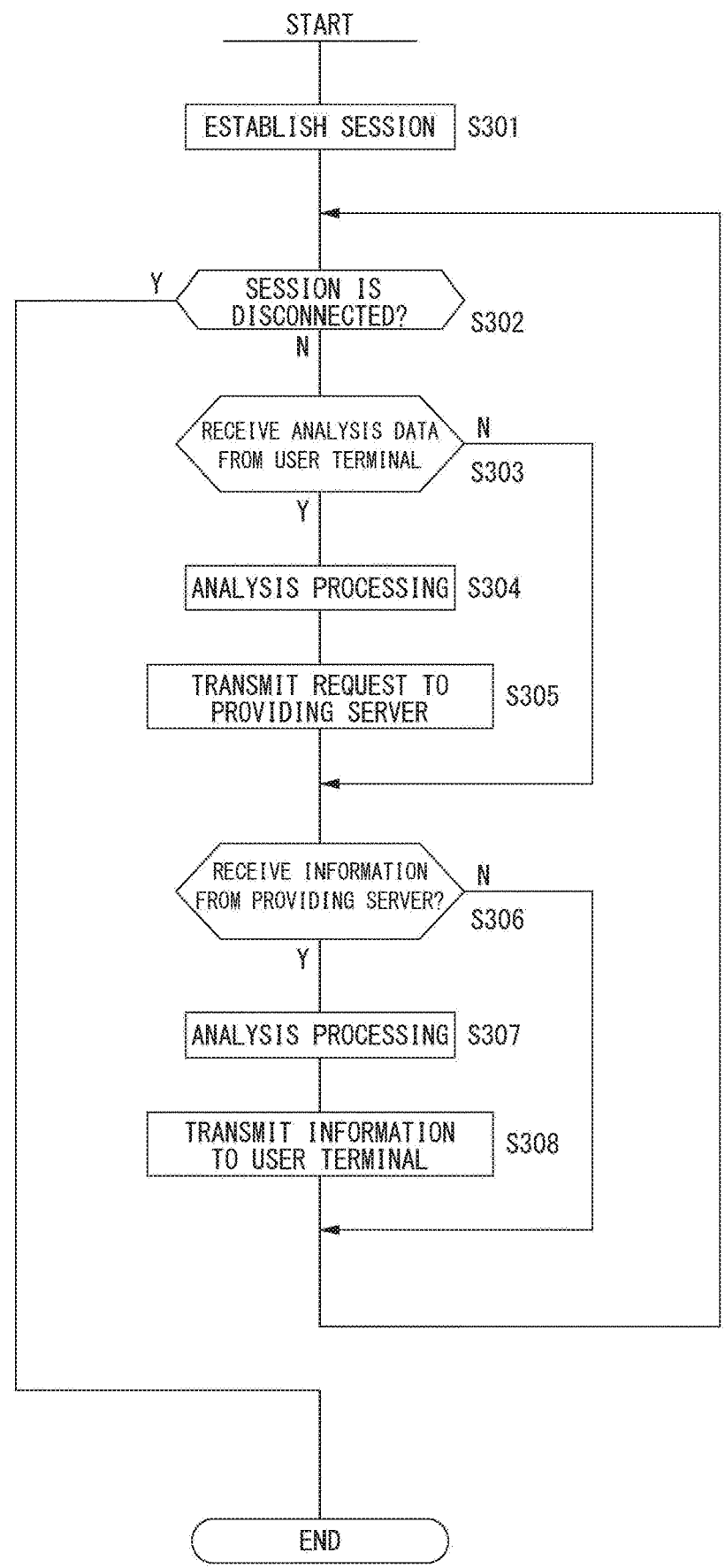

FIG. 13 is an explanatory diagram of a procedure of processing of an assistant server of the first embodiment.

Figure 14:
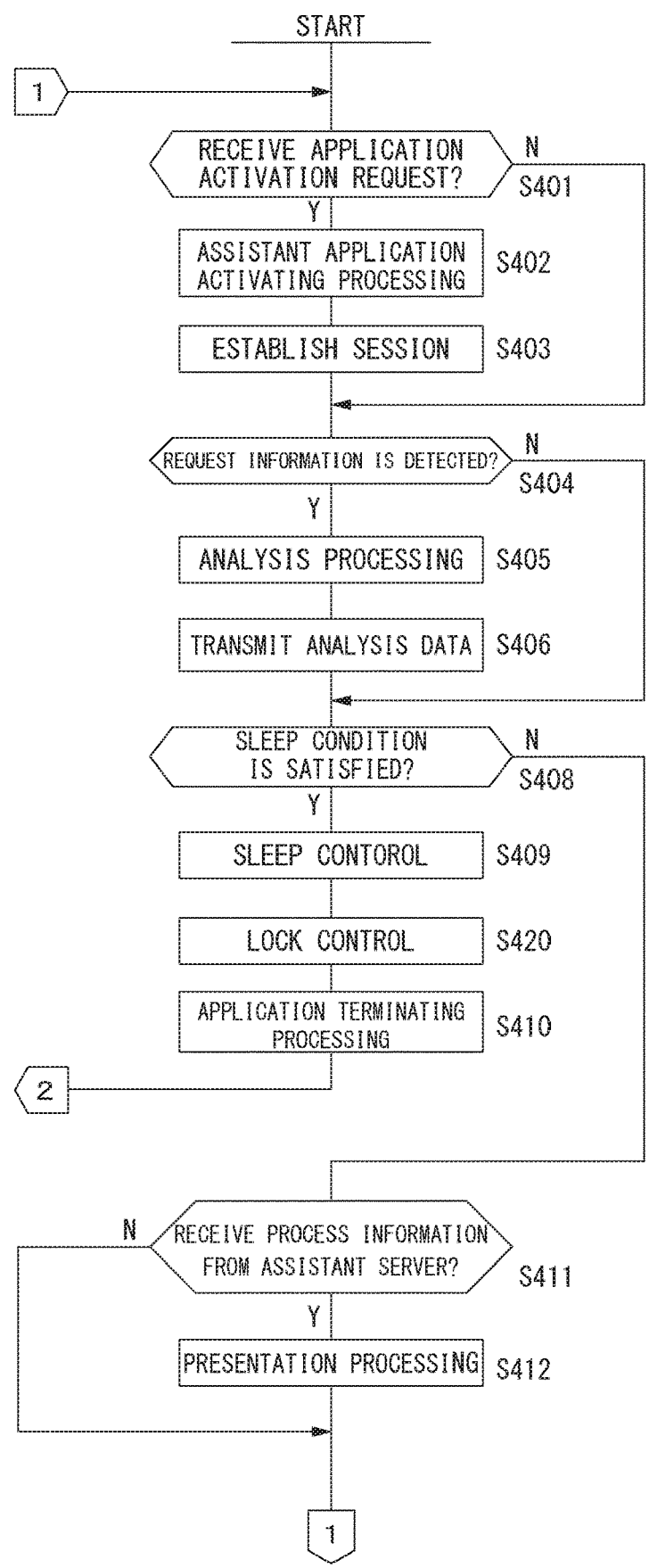

FIG. 14 is an explanatory diagram of a procedure of processing of a user terminal of the first embodiment.

Figure 15:
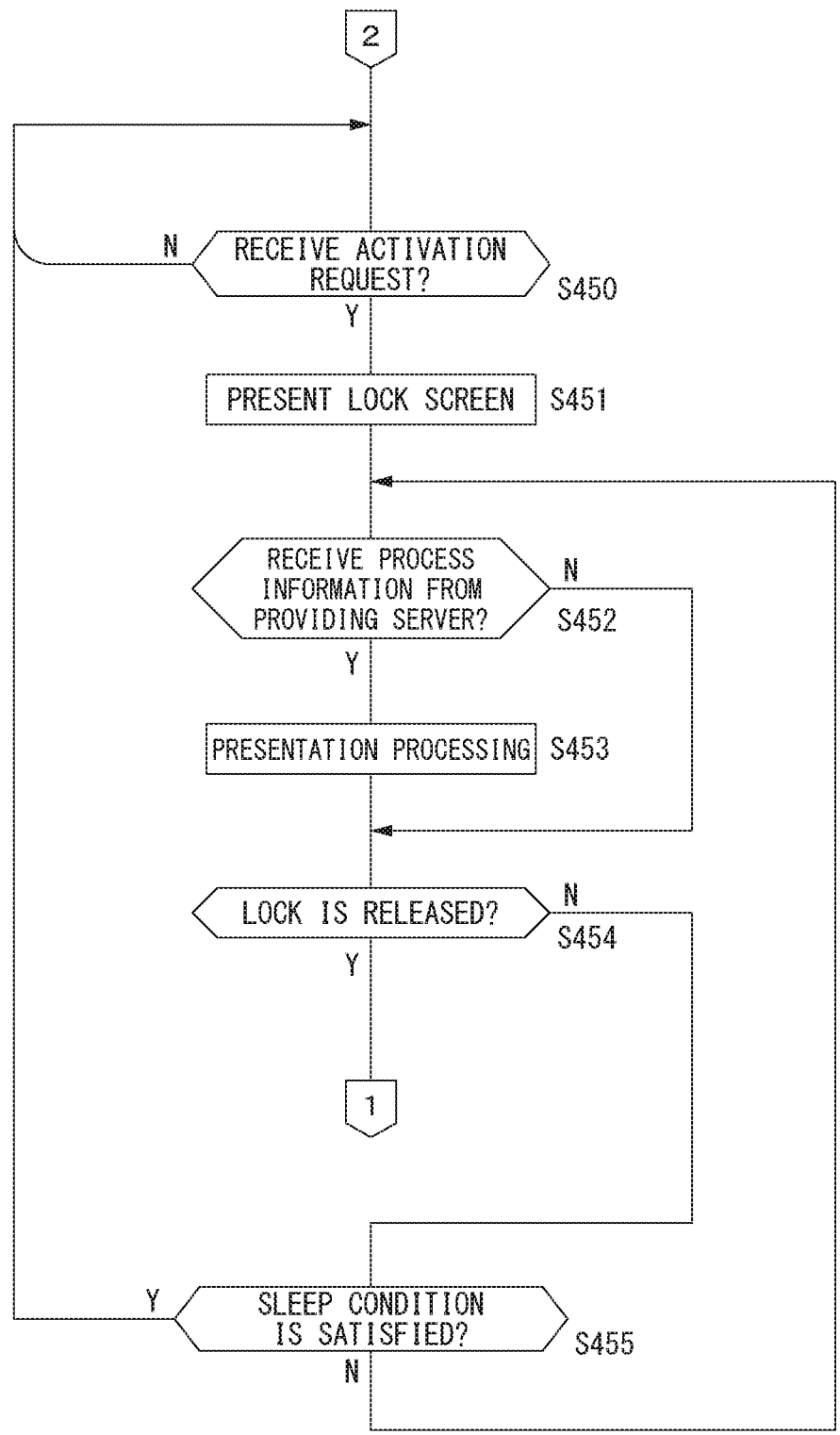

FIG. 15 is an explanatory diagram of the procedure of the processing of the user terminal of the first embodiment.

Figure 16:
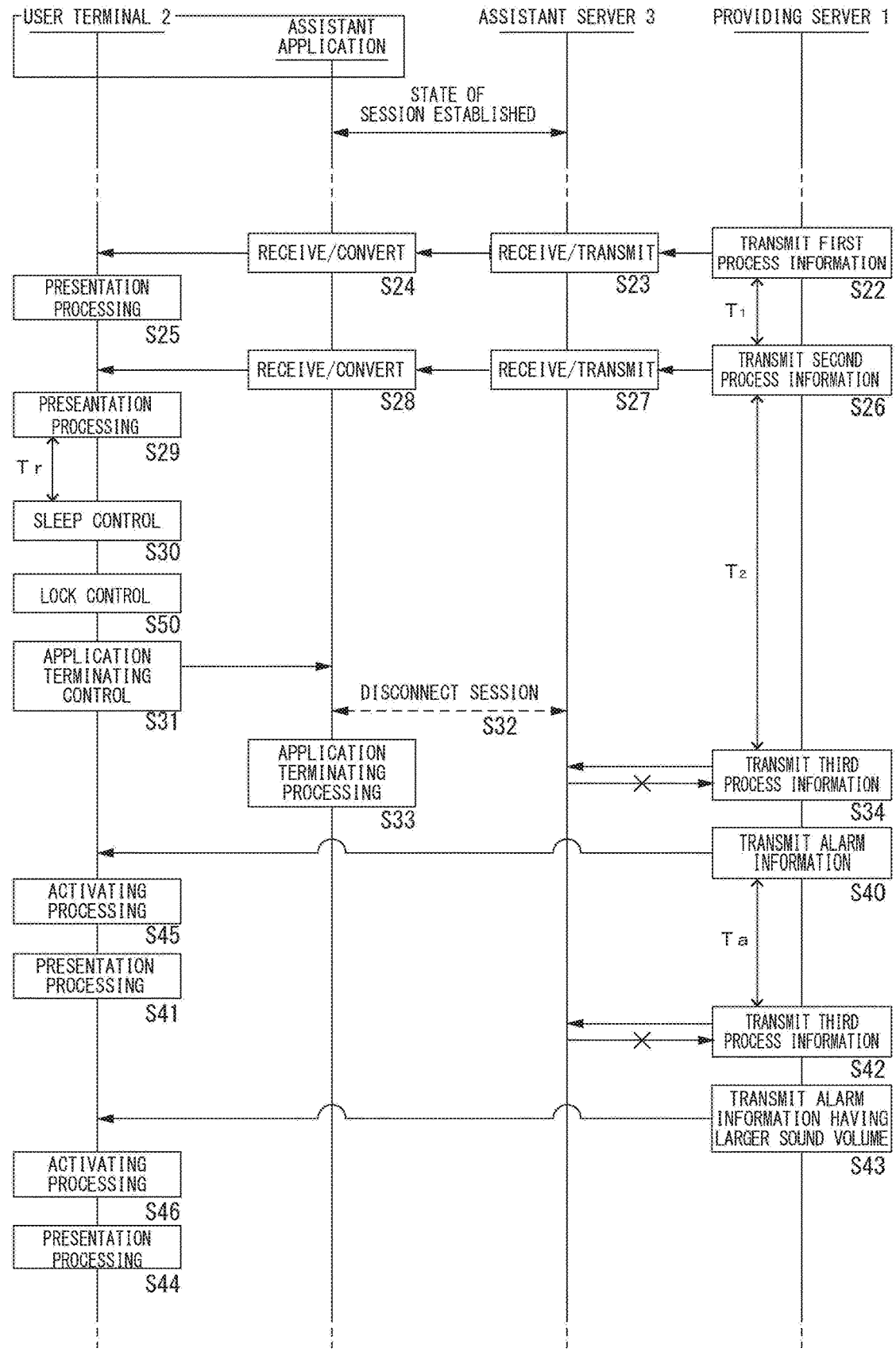

FIG. 16 is an explanatory diagram of a procedure of processing of a whole system of a second embodiment.

Figure 17:
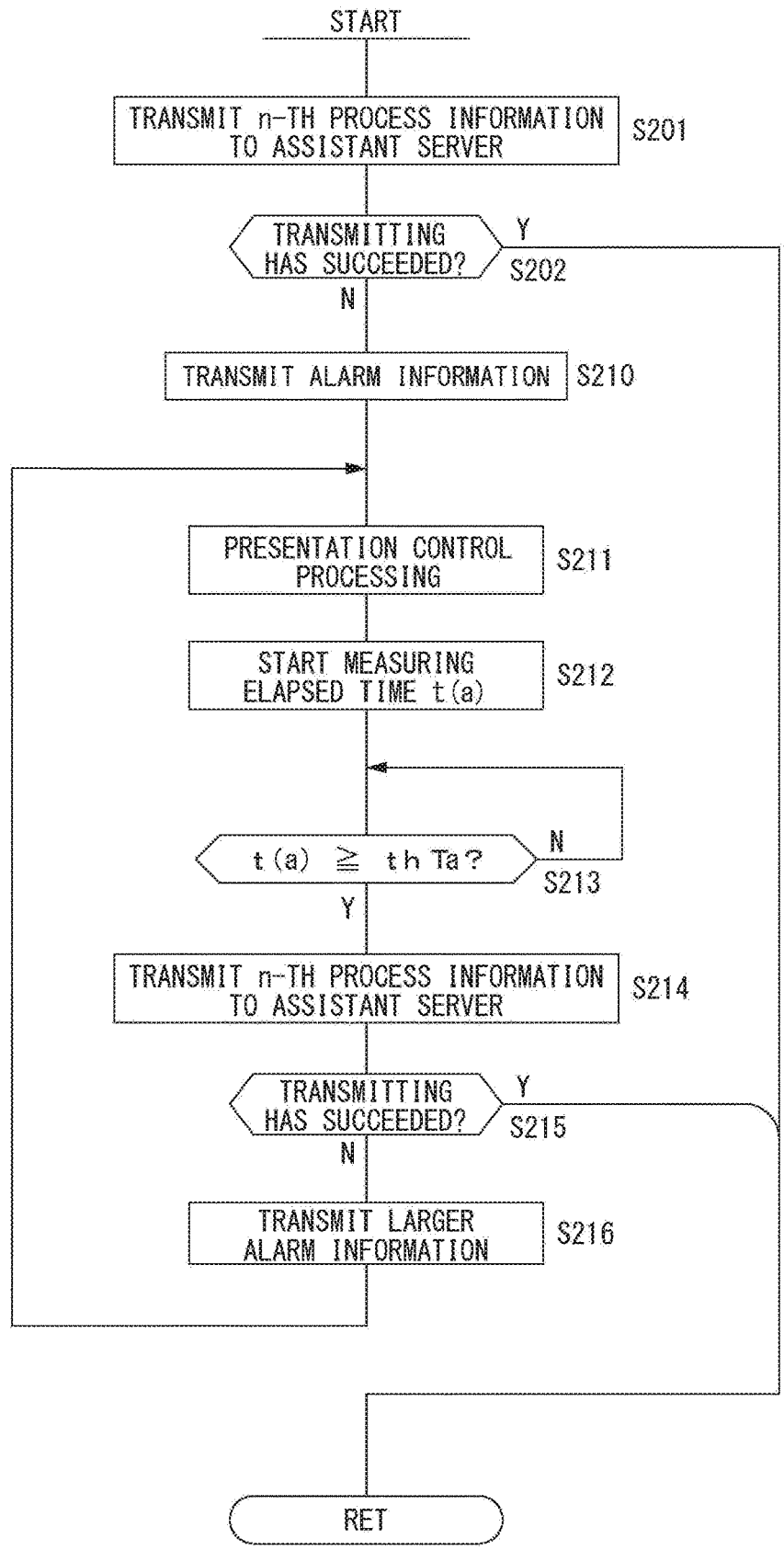

FIG. 17 is an explanatory diagram of a procedure of processing of a providing server of the second embodiment.

Figure 18:
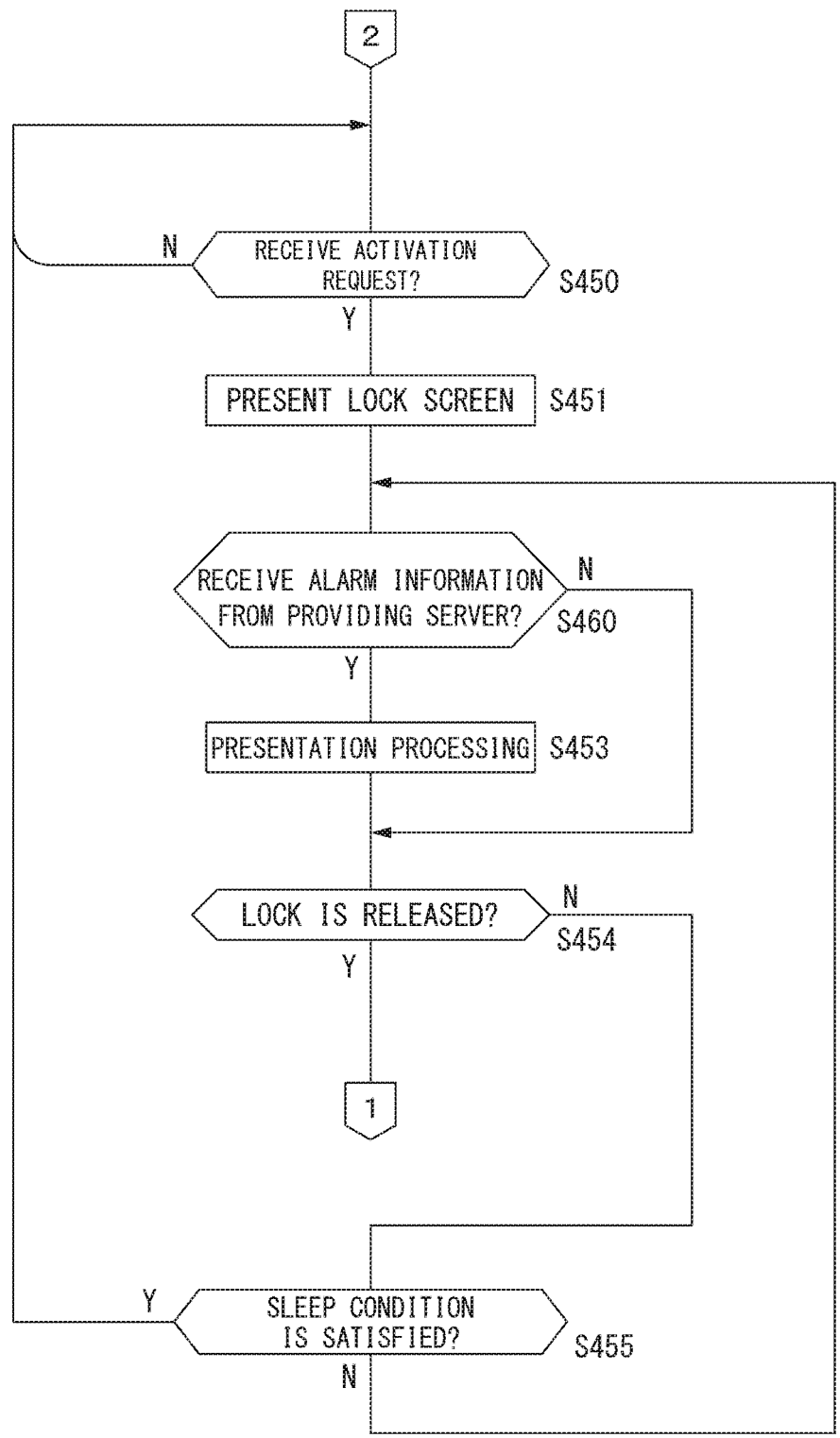

FIG. 18 is an explanatory diagram of a procedure of processing of a user terminal of the second embodiment.

DESCRIPTION OF EMBODIMENTS

1. Overall Configuration

The following describes an overall configuration of a network system in an embodiment.

Figure 1:
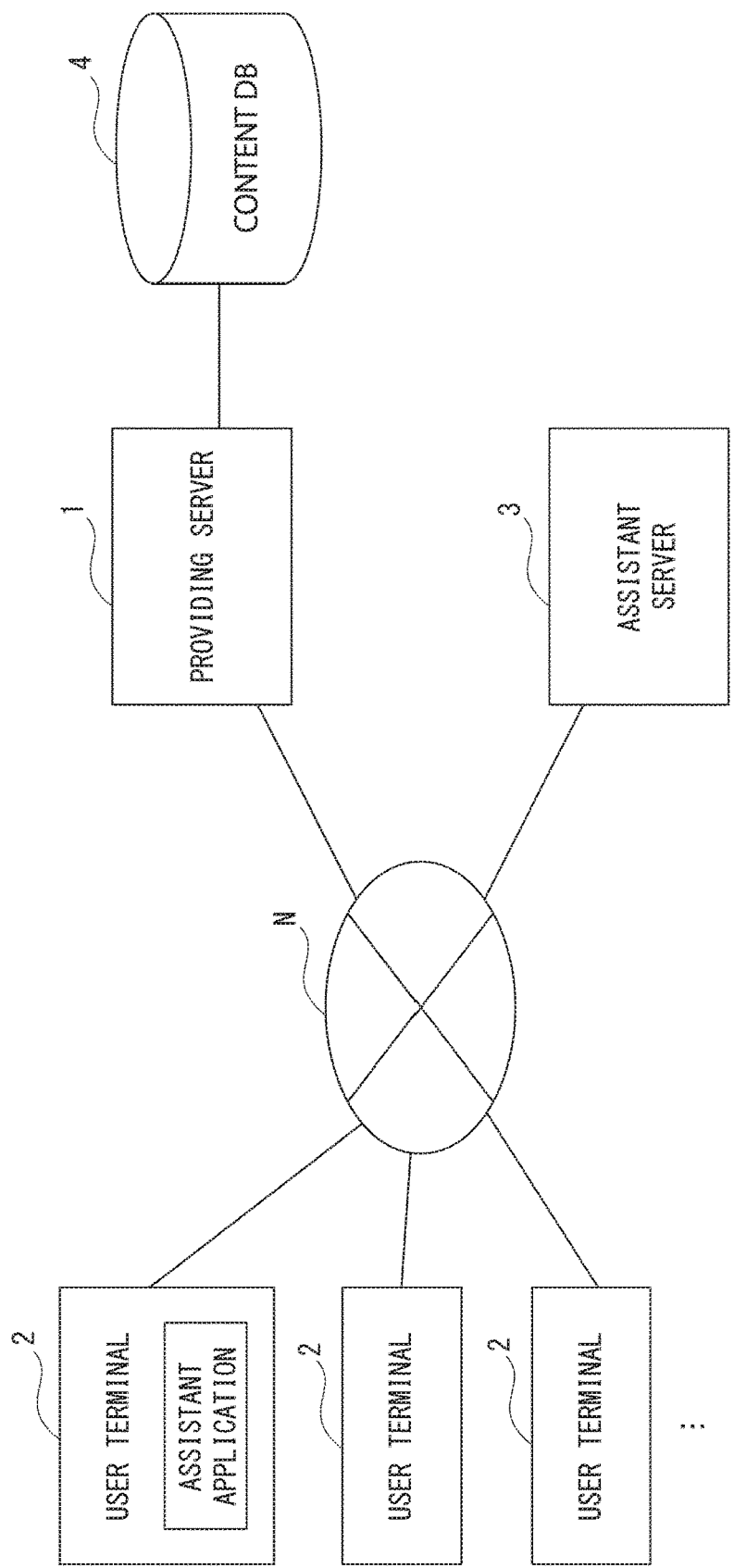
FIG. 1 is an explanatory diagram of an exemplary configuration of a network system of an embodiment.

FIG. 1 illustrates an exemplary configuration of the network system of the embodiment. In this example, the network system functions as an assistant system that presents information in accordance with a request by a user in response to an input operation by the user.

In the embodiment, a description will be given of an example where the assistant system presents each piece of process information of a food started to be cooked from now when the user performs cooking operations.

A providing server 1 in FIG. 1 corresponds to an information processing device in the claims of the present invention.

As illustrated in FIG. 1, in the network system according to the embodiment, the providing server 1, one or a plurality of user terminals 2, and an assistant server 3 are coupled by a network N in a mutually communicative state. The providing server 1 is accessible to a content database 4. Hereinafter, a database is also described as a DB (Database).

Various examples are possible for a configuration of the network N. For example, internet, intranet, extranet, Local Area Network (LAN), Community Antenna TeleVision (CATV) communications network, Virtual Private Network (VPN), telephone network, mobile communications network, and satellite communications network are possible.

Various examples are possible also for a transmission medium that configures all or a part of the network N. For example, it is usable either in wired with, for example, Institute of Electrical and Electronics Engineers (IEEE) 1394, Universal Serial Bus (USB), power-line carrier, and telephone line, or in wireless with, for example, infrared, such as Infrared Data Association (IrDA), Bluetooth (registered trademark), 802.11 wireless, mobile phone network, satellite channel, and terrestrial digital network.

The providing server 1 is an information processing device having information to be presented by the user terminal 2. In the embodiment, the providing server 1 is described as an information processing device having cooking information as one example.

The cooking information includes information, such as a name of food, ingredients used for the food, processes for cooking the food, and an estimated operation time for each process.

The providing server 1 is achieved by, for example, a computer device with a communication function placed in, for example, a provider company of content information regarding, for example, cooking.

The user terminal 2 is an information processing device including an assistant application for providing a service by the assistant system to the user. The assistant application is a program that causes the user terminal 2 to execute various kinds of processing to achieve the assistant system. Executing the processing of the assistant application using an Operating System (OS) function of the user terminal 2 achieves the assistant system of the embodiment.

By operating the user terminal 2, the user can obtain information in accordance with the request by the user by the assistant application. For example, a feature phone and a PDA with the communication function, or a smart device, such as a smart phone and a tablet terminal are possible as the user terminal 2. The user terminal 2 may be achieved by, for example, a PC with the communication function.

The assistant server 3 establishes a communication session with the assistant application in accordance with the request from the user terminal 2. The assistant server 3 is an information processing device that analyzes input information by the user received from the user terminal 2, which includes the assistant application, in a state where the communication session with the assistant application is established, and transmits a request in accordance with the analyzed input information to the providing server 1.

In a state where the communication session between the providing server 1 and the assistant server 3 is established, the providing server 1 transmits information in accordance with a processing request generated by the assistant server 3 based on the input data of the user terminal 2. This causes an output based on the transmitted information to be performed on the user terminal 2.

The assistant server 3 is achieved by, for example, a computer device with the communication function placed in, for example, a provider company of the assistant application.

The content DB 4 indicates a DB that stores information necessary for the providing server 1 to execute processing to transmit content information. While in the embodiment, the content DB 4 will be described as one example, the DB is not limited to the content DB 4, and obviously, any DB necessary to function as the providing server 1 of the internet other than the content DB 4 may be included for its configuration. The content DB 4 will be described in details later.

Figure 2:
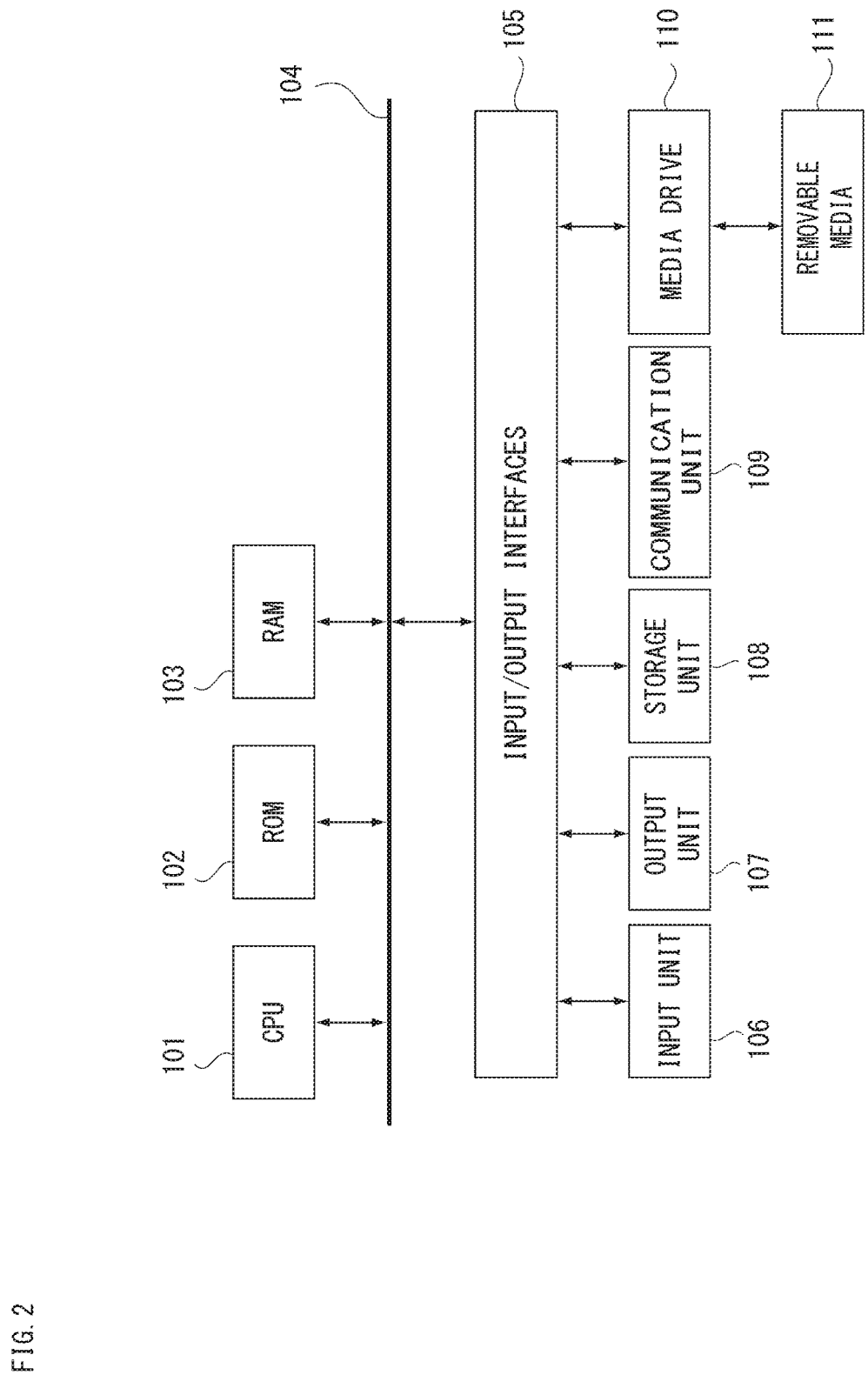
FIG. 2 is an explanatory diagram of a hardware configuration of the embodiment.

Next, FIG. 2 illustrates a hardware configuration of an information processing device that configures the providing server 1, the user terminal 2, the assistant server 3, and the content DB 4 illustrated in FIG. 1. Respective devices represented as the providing server 1, the user terminal 2, the assistant server 3, and the content DB 4 can be achieved as a computer device that can process information and communicate information as illustrated in FIG. 2.

In FIG. 2, a Central Processing Unit (CPU) 101 of the computer device executes various kinds of processing in accordance with programs stored in a Read Only Memory (ROM) 102 or programs loaded by a Random Access Memory (RAM) 103 from a storage unit 108. The RAM 103 also appropriately stores, for example, data necessary for the CPU 101 to execute various kinds of processing.

The CPU 101, the ROM 102, and the RAM 103 are mutually coupled via a bus 104. This bus 104 is also coupled to input/output interfaces 105.

An input unit 106 including, for example, a keyboard, a computer mouse, and a touch panel, an output unit 107 including, for example, a display including, for example, a Liquid Crystal Display (LCD), a Cathode Ray Tube (CRT), and an organic Electroluminescence (EL) panel, and a speaker, the storage unit 108 configured of, for example, a Hard Disk Drive (HDD) and a flash memory device, and a communication unit 109 that performs communication processing and a communication between devices via the network N are coupled to the input/output interfaces 105.

A media drive 110 is coupled to the input/output interfaces 105 as necessary. A removable media 111, such as a magnetic disk, an optical disk, a magnet-optical disk, or a semiconductor memory, is appropriately mounted, and writing and reading of information on and out of the removable media 111 are performed.

In such a computer device, it is possible to upload and download data and programs through a communication by the communication unit 109 and deliver and receive data and programs via the removable media 111.

The CPU 101 performing processing operations based on various kinds of programs executes information processing and communications necessary as the providing server 1, the user terminal 2, the assistant server 3, and the content DB 4.

The information processing device that configures the providing server 1, the user terminal 2, the assistant server 3, and the content DB 4 is not limited to be configured of a computer device as in FIG. 2 alone, and may be configured such that a plurality of computer devices are systemized. The plurality of computer devices may be systemized by, for example, a Local Area Network (LAN) or may be disposed in a communicative state in a remote location by, for example, a Virtual Private Network (VPN) that uses the internet or the like. The plurality of information processing devices may include an information processing device as a server group (cloud) that can be used by a cloud computing service.

2. Functions of Server, User Terminal, and Database

Figure 3:
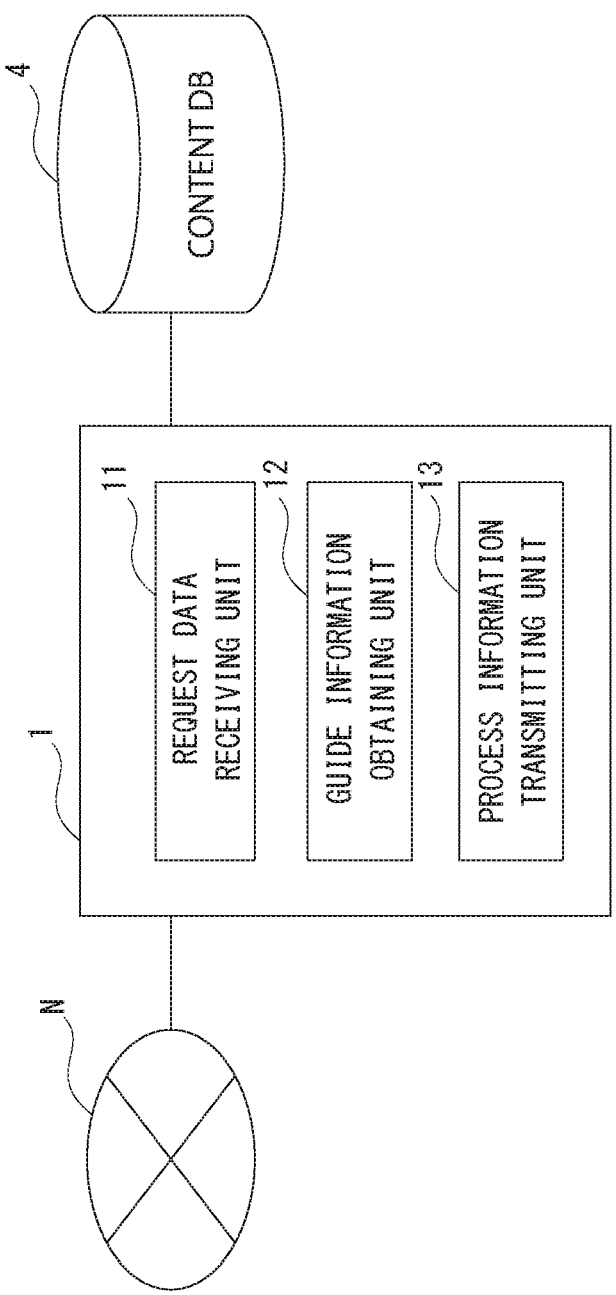
FIG. 3 is an explanatory diagram of a user database of the embodiment.

With reference to FIG. 1 and FIG. 3, functions of the providing server 1, the user terminal 2, the assistant server 3, and the content DB 4 will be described.

Here, the providing server 1, the user terminal 2, and the assistant server 3 are configured of one or a plurality of information processing devices. The respective functions of the providing server 1, the user terminal 2, and the assistant server 3 are functions achieved by processing executed in accordance with programs by the CPU 101 in the information processing device. However, all or a part of processing of each configuration described below may be achieved by hardware.

When the respective functions are achieved by software, it is not necessary that the respective functions are achieved by the respective independent programs. Processing of a plurality of the functions may be executed by one program, or one function may be achieved by a cooperation of a plurality of program modules. Each of the functions may be dispersed in the plurality of information processing devices. Furthermore, one of the functions may be achieved by the plurality of information processing devices.

As illustrated in FIG. 3, the providing server 1 includes a request data receiving unit 11, a guide information obtaining unit 12, and an information transmitting unit 13.

In a state where a communication session between the user terminal 2 including the assistant application and the assistant server 3 is established, the request data receiving unit 11 receives, from the assistant server 3 that executes processing to analyze the input information received from the user terminal 2, the request in accordance with the analyzed input information.

The guide information obtaining unit 12 obtains guide information including a plurality of processes in accordance with the request received from the assistant server 3 by the request data receiving unit 11. Here, the guide information is information including a plurality of pieces of process information necessary for the user to perform a certain operation. In the embodiment, as one example, the guide information is cooking information. The cooking information includes a name of food, ingredients used for the food, process information on each process for cooking the food, and estimated time information estimated for each process.

The information transmitting unit 13 transmits process information corresponding to each of timings of respective processes of the cooking information to the assistant server 3 in the state where the communication session between the user terminal 2 and the assistant server 3 is established by the assistant application.

The information transmitting unit 13 transmits predetermined information to the user terminal 2 at each predetermined timing based on the estimated time information included in the cooking information in a state where the communication session between the user terminal 2 and the assistant server 3 is disconnected. The communication session between the user terminal 2 and the assistant server 3 is disconnected by, for example, the assistant application being terminated when the user terminal 2 goes into a sleep state.

Here, the predetermined timing means, for example, a timing at which the estimated time estimated to be necessary elapses when the user performs each process of recipe information. It may be a timing at which a certain period of time set in advance elapses. The predetermined timing is not limited to the above-described timings, and various aspects are possible.

The predetermined information means, for example, information on each process included in the guide information for the user to perform operations. It is the cooking information in the embodiment. The predetermined information is not limited to the above-described information, and includes various kinds of information to present to the user, such as information to request a lock release, notify an alarm tone, and vibrate the user terminal 2.

The user terminal 2 activates the assistant application by its OS function upon detecting an activating operation. The user terminal 2 establishes the communication session with the assistant server 3 by the activated assistant application. Then, the user terminal 2 transmits various requests in accordance with the input information by the user to the assistant server 3 by the assistant application.

The user terminal 2 executes various kinds of processing in accordance with the information received from the assistant server 3 and the providing server 1.

The user terminal 2 performs a control to go into the sleep state after a lapse of a certain period of time by setting. In this case, the user terminal 2 performs processing to terminate the assistant application. The user terminal 2 performs a control to make itself go into a lock state when it goes into the sleep state.

Upon detecting various input operations from the user by the OS function of the user terminal 2, the assistant application analyzes the input information by the input operation. In the embodiment, a description will be given of an input operation by voice of the user. Obviously, the input operation is not limited to the input operation by voice, and various input aspects, such as a manual terminal operation by the user and an operation by text input, are considered.

The assistant application, for example, analyzes the input voice data into text data, and transmits the text data to the assistant server 3. The information received from the assistant server 3 by the user terminal 2 causes the user terminal 2 to execute various kinds of processing by the assistant application.

The assistant server 3 analyzes the text data received from the user terminal 2 by the assistant application, and transmits various requests in accordance with the analyzed information to the providing server 1.

The assistant server 3 transmits the information received from the providing server 1 to the user terminal 2.

Next, a description will be given of the content DB 4 used by the providing server 1 including the above-described function to obtain the guide information (cooking information) in accordance with the request from the user terminal 2 via the assistant server 3. Obviously, the DB may be configured including another DB necessary to function as the providing server 1 of the internet other than the content DB 4.

The content DB 4 stores, for example, the guide information for operations regarding respective contents as illustrated in FIG. 4. In the embodiment, the cooking information is stored. For example, information, such as a name of food, ingredients used for the food, processes for cooking the food, and an operation time estimated for each process, is associated and stored as the cooking information with respect to an Identification (ID) as identification information of each food.

The content DB 4 stores various kinds of web page data that configure this assistant system. The stored web page data includes, for example, description information on each process and information on ingredients used in a recipe. These web page data are, for example, a structured document file, such as a Hyper Text Markup Language (HTML) and an Extensible Hyper Text Markup Language (XHTML).

The providing server 1 presents images and texts obtained from the content DB 4 on a browser of the user terminal 2 via the assistant server 3.

Each of the DBs, such as the above-described content DB 4, may be established in a server computer different from the providing server 1, or may be established in the providing server 1.

For convenience of illustration and explanation, the DB has been represented as the content DB 4, the DB may be achieved in any configuration as long as the providing server 1 is accessible. For example, a storage unit in an identical system of the providing server 1 may include all the DBs, or a part or all of the DBs may be disposed in computer systems, for example, in a separate body and in a remote location. Obviously, it is not necessary that each of the DBs is formed within one device (for example, one HDD). It is not necessary that each of the DBs is configured as each one DB. For example, information stored as the content DB 4 may be stored and managed by a plurality of the DBs (for example, content DB regarding ingredient information and content DB regarding process information), or information stored as the content DB 4 may be stored and managed by another DB. Each of the above-described DBs described in the embodiment are merely an example where the storage unit for information regarding processing in the embodiment is in a form of one DB each.

<3. Outline of Presentation Screen on User Terminal>

A description will be given of an outline of a presentation screen on the user terminal 2 in the embodiment. Exemplary screens presented on the user terminal 2 when the user uses this assistant system will be described by referring to FIG. 5A to FIG. 8B.

Figure 5A:
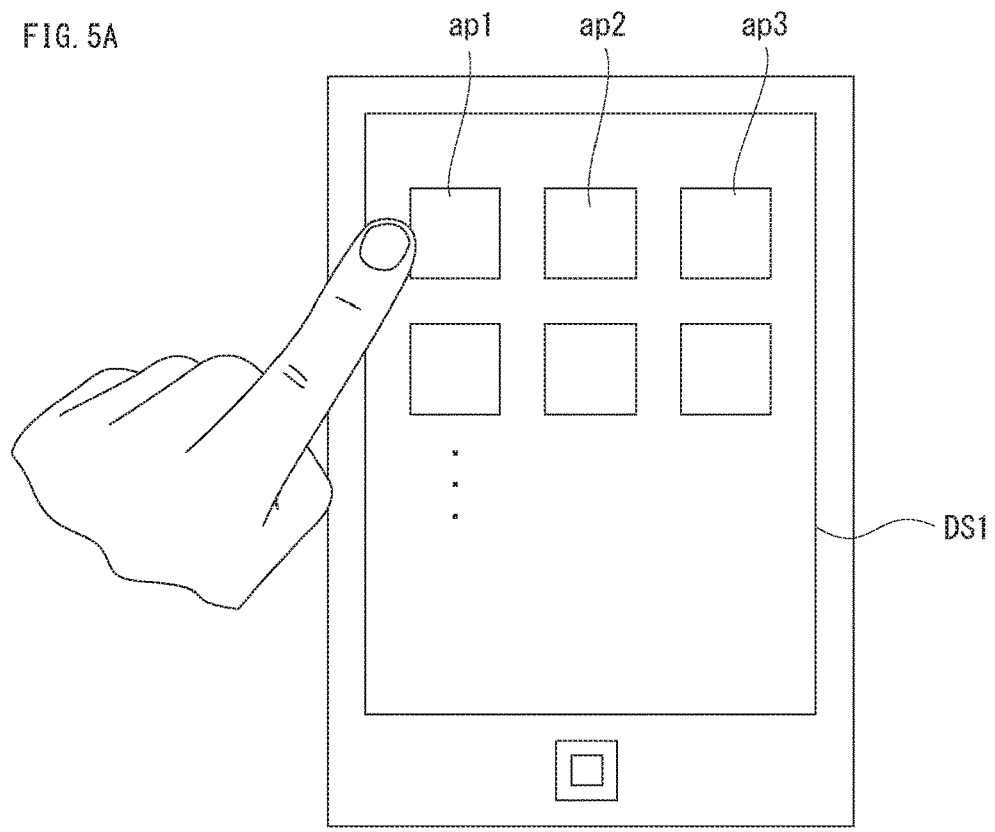
FIGS. 5A and 5B are explanatory diagrams of the outline of the presentation screen on the user terminal of the embodiment.

FIG. 5A is a function selection screen DS1 presented by the user terminal 2. The user operates to select various functions on the screen with, for example, a touch panel of the user terminal 2 to achieve various functions by the user terminal 2. The function selection screen DS1 may be achieved by, for example, a Graphical User Interface (GUI).

On the function selection screen DS1, icons ap1, ap2, ap3 . . . are displayed. The user operates to select each of the icons ap, and the user can activate applications corresponding to the respective icons ap. In the embodiment, for example, the user selects the icon ap1, and an assistant application that achieves this assistant system is activated.

Figure 5B:
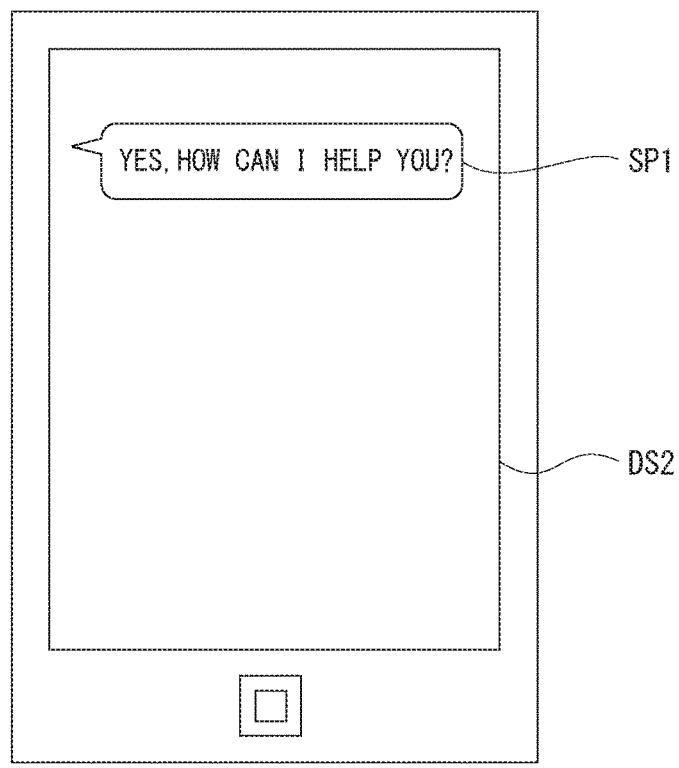

When the assistant application is activated, the user terminal 2 displays an assist screen DS2 as illustrated in FIG. 5B.

On the assist screen DS2, a speech bubble SP1 with letters saying, for example, "Yes, how can I help you?" is displayed first from the assistant application side. The user terminal 2 reads out the displayed letters by processing on the OS function by the assistant application when the speech bubble SP1 is displayed to notify the user in a voice format.

Next, the user performs the input operation of information of, for example, "What food do you recommend?" This input operation is an input operation by voice of the user.

Figure 6A:
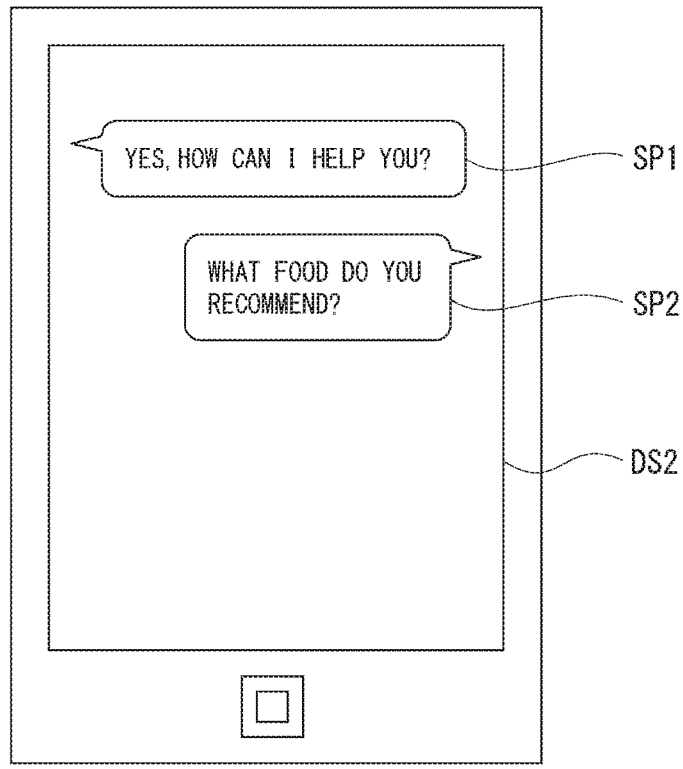

In view of this, a speech bubble SP2 with letters saying such as "What food do you recommend?" is displayed on the assist screen DS2 in response to the input operation by voice of the user as illustrated in FIG. 6A.

While the embodiment is described with an example of the input operation by voice, the user may perform the input operation by performing an operation of typing a text into the user terminal 2.

Figure 6B:
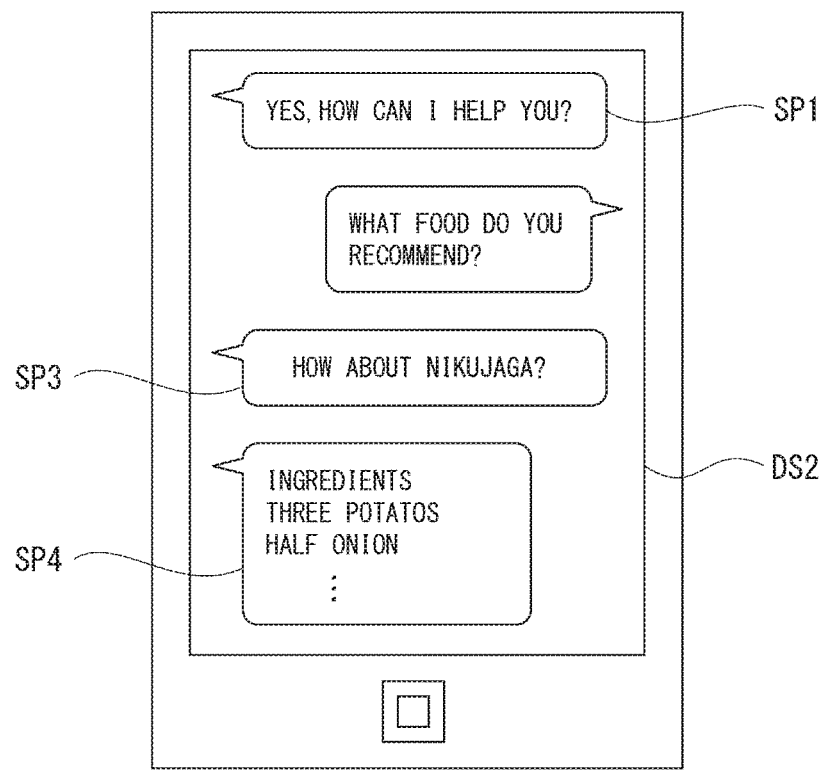

The assistant application side displays suggested cooking information on the assist screen DS2 in response to such a request of the recipe information by the user. Here, as one example, when the suggested food is "nikujaga," a speech bubble SP3 with letters saying such as "How about nikujaga?" is displayed on the assist screen DS2 as illustrated in FIG. 6B. The user terminal 2 reads out the displayed letters when the speech bubble SP3 is displayed to notify the user in a voice format.

The assistant application side at this time displays information on ingredients necessary for cooking on the assist screen DS2. For example, a speech bubble SP4 with letters saying, for example, "three potatoes, half an onion, half a carrot, a hundred grams of beef . . . " is displayed for ingredients to cook the food "nikujaga."

In the speech bubble SP4, a Uniform Resource Locator (URL) of a link destination to the web page on which the ingredients necessary for the cooking is displayed may be presented. The assistant application side may display the speech bubble SP4 when the user requests to present the ingredients.

While it is not illustrated, when suggesting the food, the assistant application side may display an outline of process in the cooking information on the food on the assist screen DS2 or may present an URL of a link destination to a web page on which the whole process is displayed.

Thus, in this assistant system, the assistant application side answers a request from the user side in an interactive format.

Assume that the user who has browsed the food presented in the speech bubbles SP3 and SP4 desires to cook the food. In this case, the user side performs the input operation of information of, for example, "Show me how to cook," when the user starts to cook after preparing the ingredients. By doing this, the user side requests the desired cooking information (guide information) from the assistant application side.

Figure 7A:
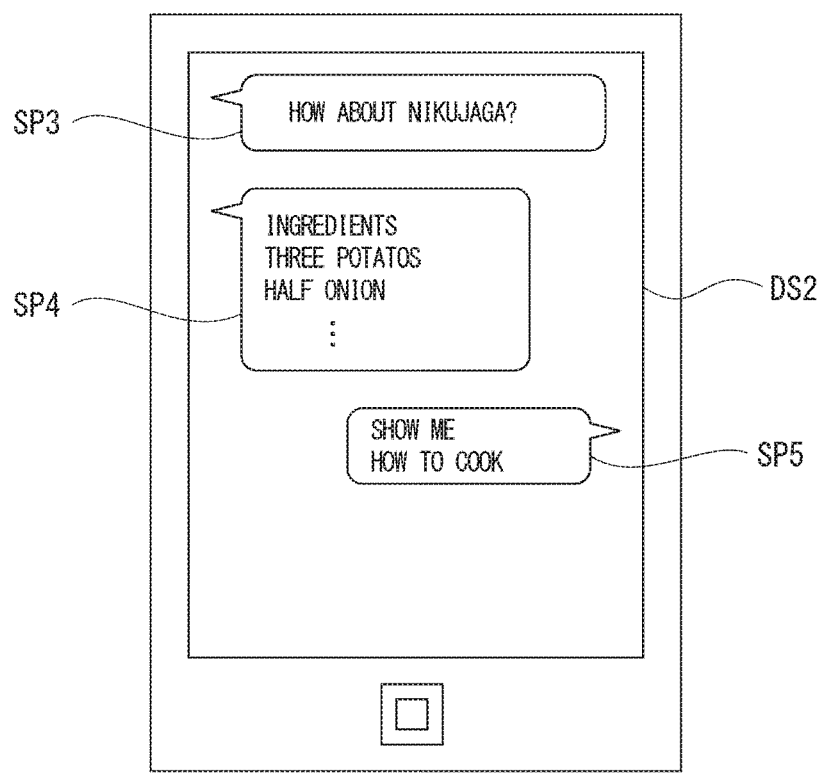

In view of this, as illustrated in FIG. 7A, a speech bubble SP5 with letters saying "Show me how to cook" is displayed on the assist screen DS2.

When the user desires to select a food other than the presented food, the user side can request it from the assistant application side by, for example, the voice input. This causes the assistant application side to suggest another food. The user side may make a request by setting various conditions, such as food genre, ingredients to be used, and how many servings, when requesting a food.

In response to the request of the recipe information from the user, the assistant application side presents information per process for the recipe.

For example, assume that the recipe of the food "nikujaga" includes a "process to cut vegetables, beef, and similar ingredient," a "process to fry the vegetables, the beef, and similar ingredient," a "process to add a stock and stew," and a "process to turn off the heat to complete cooking nikujaga."

Figure 7B:
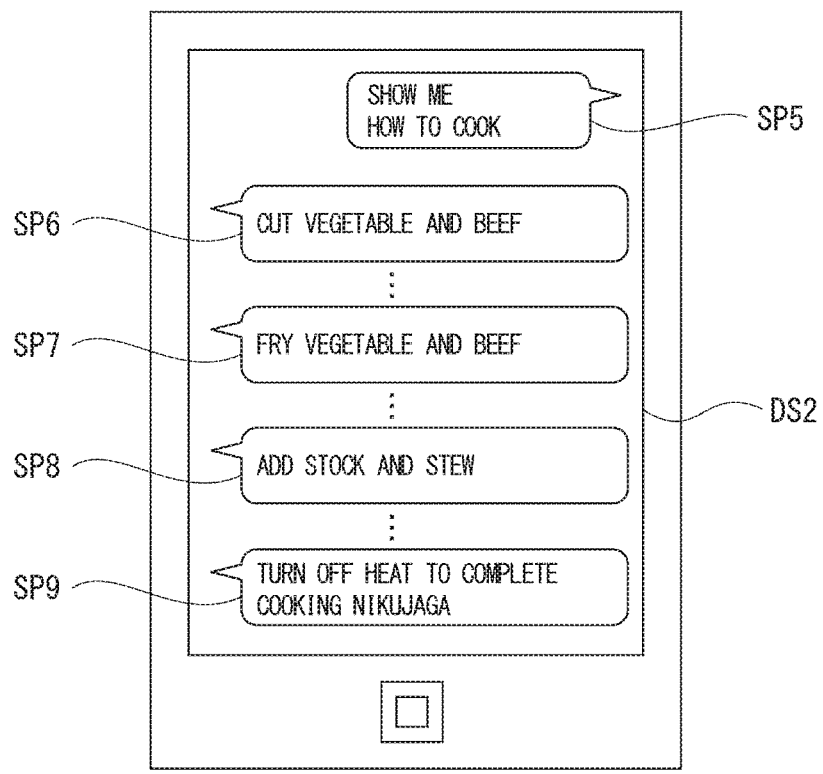

In this case, the assistant application side displays a speech bubble SP6 in which the "process to cut vegetables, beef, and similar ingredient" at the beginning is described on the assist screen DS2 as illustrated in FIG. 7B. Then, after a lapse of a predetermined time from this display, a speech bubble SP7 in which the next "process to fry the vegetables, the beef, and similar ingredient" is described is displayed on the assist screen DS2 assuming that the "process to cut vegetables, beef, and similar ingredient" has finished.

Thus, the assistant application side displays information on the next process on the assist screen DS2 after a time set in advance as an operation time estimated for each process elapses.

Thus, every time the operation time of each process elapses, the "process to add a stock and stew" is displayed as a speech bubble SP8, and the "process to turn off the heat to complete cooking nikujaga" is displayed in a speech bubble SP9. Then, the display like the speech bubble SP9 of the "process to complete cooking" terminates the information presentation per process on the user side.

In such an assistant system, there sometimes is a case where a relatively long period of time, such as 20 minutes, is set until, for example, the "process to turn off the heat to complete cooking nikujaga" is displayed after the "process to add a stock and stew" is displayed in the process of "nikujaga."

Here, the user terminal 2 transitions into the sleep state approximately in 30 seconds by setting. It is set that the user terminal 2 goes into the lock state after transitioning into the sleep state.

The user terminal 2 going into the sleep state interrupts processing by the assistant application, and the communication session between the user terminal 2 including the assistant application and the assistant server 3 is disconnected. Therefore, the providing server 1 can no longer transmit the process information of the cooking to the user terminal 2 via the assistant server 3. Accordingly, it is no longer possible to continuously notify the user of each piece of process information of the cooking.

Figure 8A:

In this case, upon recovering from the sleep state, the user terminal 2 displays a lock screen DS3, for example, as illustrated in FIG. 8A, on the display. The user needs to manually perform a release operation in the user terminal 2 in order to release the lock state of the user terminal 2. After recovering the user terminal 2 from the lock state, the user activates the assistant application or the like to establish the communication session with the assistant server 3 again. Then, the recipe information on the food that has been cooked is requested again from the assistant application side.

However, it is inconvenient for the user that the user has to communicate with the assistant application side as illustrated in FIG. 5A again despite a food that the user desires to cook is already determined.

The user who is cooking a food has a demand that the user hesitates to touch the user terminal 2 when performing operations of sleep release, lock release, and similar operation from the aspect of good hygiene and hesitation of contaminating the terminal.

Therefore, the assistant system in the embodiment is configured to continuously display the process subsequent to the process, which was displayed on the assist screen DS2 immediately before, on the lock screen DS3 of the user terminal 2 even when the user terminal 2 goes into the lock state by going into the sleep state.

For example, assume that, in FIG. 7B, after the "process to add a stock and stew" is displayed as the speech bubble SP8 on the assist screen DS2, the user terminal 2 goes into the sleep state after a lapse of a predetermined time.

Figure 8B:
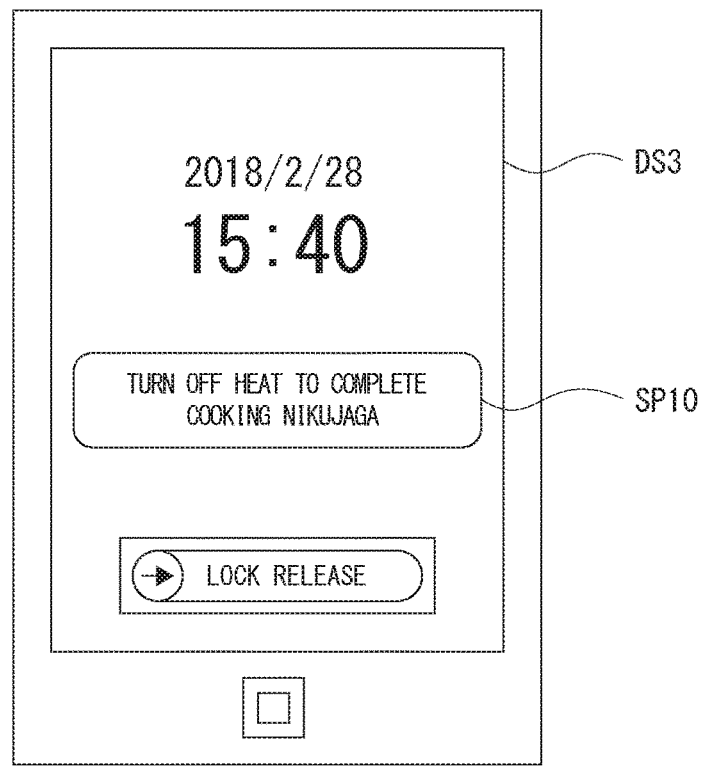

In this embodiment, even in such a case, the user terminal 2 recovers from the sleep state, and displays the next process of the "process to turn off the heat to complete cooking nikujaga" in a speech bubble SP10 on the lock screen DS3 at the timing when it is estimated that the user has completed the "process to add a stock and stew" as illustrated in FIG. 8B. This display is presented by, for example, a push notification. At this time, for example, a notification of the process by voice such as reading out a content of the process is performed. This notification is continuously performed until all the processes of the recipe are finished.

This ensures the user continuously cooking without manually performing the operations of lock release or similar operation even when the user terminal 2 goes into the sleep state.

The outline of the presentation screen on the user terminal in the embodiment has been described above.

4. Outline of Processing in Assistant System

In order to achieve the operation of the assistant system, a description will be given of the outline of processing executed by the user terminal 2 including the assistant application, the assistant server 3, and the providing server 1 by referring to FIG. 9 and FIG. 10. The processing by the user terminal 2 is achieved by, for example, the user terminal 2 controlling the OS function based on the program of the assistant application.

First, in FIG. 9, the user terminal 2 detects operation information of a user at Step S1. The operation information here is, for example, an operation to select, for example, the icon ap with the touch panel included in the user terminal 2 as in FIG. 5A. This input operation may be an input by voice.

At Step S2, the assistant application of the user terminal 2 executes analysis processing of the operation information detected at Step S1. The assistant application analyzes the operation information at Step S2 and converts the operation information into analysis data. The analysis data is, for example, text data.

Then, the user terminal 2 transmits the analysis data to the assistant server 3 at Step S3.

The assistant server 3 analyzes the text data received at Step S4. Then, at Step S5, a communication session between the assistant application of the user terminal 2 and the assistant server 3 is established.

Establishment of this communication session ensures the assistant server 3 analyzing the information received from the user terminal 2 and transmitting a request from the user terminal 2 to the providing server 1.

In the state where the communication session between the assistant application of the user terminal 2 and the assistant server 3 is established, the user terminal 2 recognizes the request of cooking information from the user by voice at Step S6.

Specifically, the user performs an input operation of information such as "What food do you recommend?" into the user terminal 2 by voice.

Then, the assistant application of the user terminal 2 analyzes this voice data and converts the voice data into text data at Step S7, and transmits this text data into the assistant server 3 at Step S8. The assistant application displays as the speech bubble SP2 on the assist screen DS2 of the user terminal 2 based on this text data as illustrated in FIG. 6A.

At Step S9, the assistant server 3 analyzes the text data received from the user terminal 2 by, for example, a morphological analysis, and transmits the analyzed content, that is, the request of the cooking information to the providing server 1.

At Step S11, the providing server 1 that received the request of the cooking information obtains cooking information corresponding to the cooking in accordance with this request from the content DB 4. At Step S12, the providing server 1 transmits the information regarding a food name among the obtained cooking information to the assistant server 3. For example, in the example illustrated in FIGS. 6A and 6B, the providing server 1 obtains the information of "nikujaga" as the food name and transmits the information to the assistant server 3.

The assistant server 3 receives the information regarding the food name at Step S13. The assistant server 3 converts the information regarding this food name into text data so as to correspond to the assistant application, and transmits the text data to the user terminal 2.

At Step S14, the assistant application of the user terminal 2 converts the received text data into voice data. At Step S15, the assistant application causes the user terminal 2 to display the cooking information based on this text data on the display and to execute a notification by voice based on the voice data.

Specifically, as illustrated in FIG. 6B, the letters saying such as "How about nikujaga?" are displayed in the speech bubble SP3 and this content is also notified by voice.

Termination of Step S15 causes the user terminal 2, the assistant server 3, and the providing server 1 to terminate the processing in FIG. 9, and proceed the processing to in FIG. 10.

At Step S16 in FIG. 10, a request of process information on the cooking from the user by voice is recognized. Specifically, the user performs an input operation of information such as "Show me how to cook" into the user terminal 2 by voice.

Then, the assistant application of the user terminal 2 and the assistant server 3 execute processing similar to that in the above-described Steps S7→S8→S9 in processing at Steps S17→S18→S19.

At Step S20, the request of the process information is transmitted from the assistant server 3 to the providing server 1.

At Step S22, the providing server 1 transmits first process information among the cooking information obtained at Step S11 to the assistant server 3. The first process information in the embodiment is the "process to cut vegetables, beef, and similar ingredient."

The assistant server 3 and the assistant application of the user terminal 2 executes processing similar to that at above-described Steps S13→S14→S15 at Steps S23→S24→S25.

With this processing, the assistant application causes the user terminal 2 to display the first process information on the display based on this text data, and to execute a notification by voice based on the voice data.

Then, when a time T1 set for the first process information elapses, the providing server 1 transmits second process information among the cooking information obtained at Step S11 to the assistant server 3 at Step S26. The second process information in the embodiment is the "process to fry vegetables, beef, and similar ingredient."

In the second process information, the assistant server 3 and the assistant application of the user terminal 2 execute processing similar to that at the above-described Steps S13→S14→S15 at Steps S27→S28→S29.

With this processing, the assistant application causes the user terminal 2 to display the second process information on the display based on this text data, and to execute a notification by voice based on the voice data.

After transmitting the second process information, the providing server 1 stands ready to transmit third process information to the assistant server 3 until a set time T2 elapses. The third process information in the embodiment is the "process to add a stock and stew."

Here, assume that the user terminal 2 transitions into the sleep state when a time Tr elapses because of the setting of the user terminal 2. At this time, when the time Tr is shorter than the time T2, before the providing server 1 transmits the third process information to the assistant server 3, the user terminal 2 goes into the sleep state.

In the above-described case, the user terminal 2 executes a sleep control for itself at Step S30. Then, the user terminal 2 controls to cause itself to go into the lock state at Step S50.

The user terminal 2 controls to terminate the assistant application at Step S31. This disconnects the communication session between the assistant application of the user terminal 2 and the assistant server 3 at Step S32. That is, the user terminal 2 can no longer receive the process information transmitted from the providing server 1 via the assistant server 3.

When the time T2 elapses after transmitting the second process information, the providing server 1 transmits the third process information to the assistant server 3 at Step S34. However, the communication session between the assistant application of the user terminal 2 and the assistant server 3 has already been disconnected at Step S32. Therefore, the providing server 1 cannot transmit the third process information to the assistant server 3.

The providing server 1 determines whether the process information could have been transmitted to the assistant server 3 or not by, for example, whether response information of the reception of the process information is transmitted from the assistant server 3 within a certain period of time.

When it is determined that the transmission of the third process information to the assistant server 3 has failed at Step S34, the providing server 1 directly transmits the third process information to the user terminal 2 without via the assistant server 3 at Step S35. At this time, the providing server 1 also transmits the control information to release the sleep state to the user terminal 2.

The user terminal 2 performs activating processing of the user terminal 2 to wake up from the sleep state upon receiving the third process information from the providing server 1 at Step S36, and displays the third process information on the lock screen DS3 as illustrated in FIG. 8B as a push notification based on the received data, and executes a notification by voice based on the voice data at Step S37.

Then, when the time T3 elapses after transmitting the third process information, the providing server 1 transmits fourth process information to the user terminal 2 without transmitting the fourth process information to the assistant server 3 at Step S38. In the embodiment, the fourth process information is the "process to turn off the heat to complete cooking nikujaga."

The user terminal 2, upon receiving the fourth process information from the providing server 1, displays the fourth process information on the lock screen DS3 as illustrated in FIG. 8B as a push notification based on the received data and executes a notification by voice based on the voice data at Step S39.

Hereinafter, until all the processes in the recipe information are completed, each process is displayed on the lock screen DS3 and the notification by voice is performed by processing similar to that described above.

The outline of the processing executed by the user terminal 2 including the assistant application, the assistant server 3, and the providing server 1 in order to, achieve operations of the assistant system in a first embodiment has been described above.

5. First Embodiment

The outline of processing executed by the user terminal 2 including the assistant application, the assistant server 3, and the providing server 1 in order to achieve the operations of the assistant system of the first embodiment will be described by referring to FIG. 11 to FIG. 14.

First, with reference to FIG. 11, a description will be given of processing of the providing server 1 when a request for process information of cooking is received from the assistant server 3. The request for the process information of the cooking is requested by the user terminal 2 via the assistant server 3.

The providing server 1 obtains the process information of the cooking in accordance with the request received from the assistant server 3 at Step S101. That is, the providing server 1 obtains cooking information in accordance with the request from the content DB 4.

The providing server 1 sets a variable n that indicates an order of the process to 1 at Step S102. Subsequently, the providing server 1 obtains n-th process information from the cooking information at Step S103.

Then, the providing server 1 performs predetermined information transmitting processing that transmits predetermined information to the assistant server 3 or the user terminal 2 at Step S104.

Here, the predetermined information transmitting processing at Step S104 by the providing server 1 will be described in details by referring to FIG. 12.

First, the providing server 1 transmits the n-th process information to the assistant server 3 at Step S201, and determines whether the transmission has succeeded at Step S202. The providing server 1 determines that the transmission has succeeded when, for example, the providing server 1 receives response information indicating a reception completion from the assistant server 3 by a predetermined time after from the n-th process information was transmitted to the assistant server 3.

The providing server 1 terminates the processing in FIG. 12 when it is determined that the transmission of the n-th process information to the assistant server 3 has succeeded, and returns to the processing in FIG. 11.

When the transmission of the n-th process information to the assistant server 3 fails, that is, when the response information from the assistant server 3 is not received within the predetermined time, the providing server 1 proceeds the processing from Step S202 to Step S203.

The providing server 1 transmits the n-th process information to the user terminal 2 at Step S203. That is, the providing server 1 directly transmits the n-th process information to the user terminal 2 without via the assistant server 3.

The providing server 1 executes activating control processing of the user terminal 2 in order to recover the user terminal 2 from the sleep state at Step S204. The providing server 1 causes the user terminal 2 to execute display by a push notification and a notification by voice on the lock screen DS3 as illustrated in FIG. 8B in accordance with the transmitted n-th process information at Step S205.

After the processing at Step S205, the providing server 1 terminates the processing in FIG. 12 and returns to the processing in FIG. 11.

The processing illustrated in FIG. 12 transmits the n-th process information from the providing server 1 to the assistant server 3 or the user terminal 2.

Referring again to FIG. 11, the providing server 1 that terminated the processing at Step S104 starts measuring a process time $t(n)$ in accordance with the n-th process information transmitted at Step S105.

The providing server 1 stands by until the process time $t(n)$ becomes equal to or more than a threshold value Tn at Step S106. The threshold value Tn is a time estimated to be necessary for an operation of the n-th process, and is stored in the content DB 4 in advance as the cooking information. The providing server 1 can execute various kinds of processing in accordance with requests from the user terminal 2 and the assistant server 3 even during this standby.

When the process time $t(n)$ becomes equal to or more than the threshold value Tn, the providing server 1 determines that the user would have finished the n-th process and resets the process time $t(n)$ at Step S107.

The providing server 1 adds 1 to the variable n at Step S108 to determine whether the variable n after the addition becomes larger than the threshold value N max. The threshold value N max is the number of all the processes included in the obtained cooking information.

When the variable n after the addition is smaller than the threshold value N max, the providing server 1 returns to Step S103 to obtain the n-th process information after the addition, that is, the next process information from the cooking information. Thus, the providing server 1 continuously executes the processing at Steps S103 to S108 until all the processes are transmitted.

When the variable n becomes larger than the threshold value N max at Step S109, the providing server 1 terminates the processing in FIG. 11. This means that the providing server 1 has transmitted all the processes in the cooking information to the assistant server 3 or the user terminal 2.

Next, processing by the assistant server 3 when the assistant server 3 receives a communication session request from the assistant application of the user terminal 2 will be described by referring to FIG. 13.

First, the assistant server 3 establishes a communication session with the assistant application at Step S301. While the communication session with the assistant application is being established, the assistant server 3 loops Steps S302→S303→S306 and perform monitoring.

The assistant server 3 terminates the processing in FIG. 13 upon detecting a disconnection of the communication session with the assistant application at Step S302. The case where the communication session with the assistant application is disconnected is that, for example, when the user terminal 2 goes into the sleep state and the processing by the assistant application is interrupted.

The assistant server 3, upon receiving analysis data from the user terminal 2 at Step S303, analyzes a request content of the analysis data at Step S304. This analysis data is text data that is obtained by the user terminal 2 converting information detected from, for example, an input operation by a user for transmission to the assistant server 3. The information detected from, for example, the input operation by the user means, for example, a request for cooking information and a request for process information of cooking. Further, other various requests are also considered.

The assistant server 3 transmits a request in accordance with the analyzed content to the providing server 1 at Step S305. This transmits the request in the user terminal 2 to the providing server 1 via the assistant server 3. After the processing at Step S305, the assistant server 3 returns to the processing of the above-described monitoring loop.

The assistant server 3, upon receiving predetermined information from the providing server 1 at Step S306, proceeds the processing to Step S307 to analyze the predetermined information and convert the predetermined information into text data in accordance with the assistant application of the user terminal 2.

Here, the predetermined information means various kinds of information, such as cooking information, such as each piece of process information, and information to notify an alarm tone.

The assistant server 3 transmits this converted text data to the user terminal 2 at Step S308. After the processing at Step S308, the assistant server 3 returns to the processing of the above-described monitoring loop.

Next, processing by the user terminal 2 including the assistant application to achieve the assistant system will be described by referring to FIG. 14 and FIG. 15. In FIG. 14, the user terminal 2 loops Steps S401→S404→S408→S411 and performs monitoring.

First, the user terminal 2, upon detecting an application activating operation by an input operation by a user at Step S401, proceeds the processing to Step S402. Here, the input operation by the user is, for example, the selection operation of the icon ap with the touch panel in FIG. 5A.

Then, the user terminal 2 activates the assistant application at Step S402, and executes the processing to establish a communication session between the user terminal 2 and the assistant server 3 by the activated assistant application at subsequent Step S403.

When the processing at Step S403 is terminated, the user terminal 2 returns to the processing of the above-described monitoring loop.

The user terminal 2, upon detecting request information at Step S404, proceeds the processing to Step S405. Here, as the request information, various requests, such as a request for food suggestion and a request for process information of cooking, are considered. The user makes such a request by an input by voice into the user terminal 2.

The user terminal 2 analyzes voice data input by the assistant application at Step S405, and converts the voice data into text data appropriate for communicating with the assistant server 3. The user terminal 2 transmits this text data to the assistant server 3 at Step S406.

Upon terminating the processing at Step S406, the user terminal 2 returns to the above-described monitoring loop processing.

When a sleep condition is satisfied at Step S408, the user terminal 2 proceeds the processing to Step S409. Here, the satisfaction of the sleep condition is, for example, a state where a certain period of time has elapsed since the user stopped operating the user terminal 2. Here, the certain period of time is set by the user terminal 2, and it is, for example, 30 seconds and 3 minutes.

At this time, the user terminal 2 performs processing to control the user terminal 2 to go into the sleep state at Step S409. The user terminal 2 controls so as to put itself into the lock state at subsequent Step S420.

At Step S410, the user terminal 2 performs processing to interrupt the processing of this application when the assistant application is activated. This disconnects the communication session between the user terminal 2 and the assistant server 3 by the assistant application.

Upon terminating the processing at Step S410, the user terminal 2 terminates the processing in FIG. 14 and executes the processing in FIG. 15.

Here, with reference to FIG. 15, processing by the user terminal 2 in the sleep state will be described.

First, the user terminal 2 stands by until the user terminal 2 receives an activation request of the user terminal 2 from the providing server 1 at Step S450. Upon receiving this activation request, the user terminal 2 recovers from the sleep state, and presents the lock screen DS3 as illustrated in FIG. 8A on the display at Step S451.

The user terminal 2 can recover from the sleep state by, for example, an input operation into the user terminal 2 by the user.

The user terminal 2 loops Steps S452→S454→S455 and performs monitoring after the processing at Step S451.

The user terminal 2, upon receiving the process information from the providing server 1 at Step S452, proceeds the processing to Step S453, and performs presentation processing in accordance with this process information. The user terminal 2 displays the process information in the speech bubble SP10 as a push notification as illustrated in FIG. 8B. The user terminal 2 can notify the content of the process information by voice as well.

The user terminal 2, upon detecting a lock release operation at Step S454, releases its lock state. The user terminal 2 terminates the processing in FIG. 15, and returns to the monitoring loop processing in FIG. 14.

The user terminal 2 proceeds the processing to Step S450 and stands by until receiving the activation request when the sleep condition is satisfied at Step S455.

Referring again to FIG. 14, the user terminal 2, upon receiving the process information at Step S411, proceeds the process to Step S412. The user terminal 2 sequentially receives the process information of the requested cooking from the assistant server 3.

The user terminal 2 performs a presentation control of the process information at Step S412. For example, as illustrated in FIG. 7B, the process information is presented as the speech bubble SP on the assist screen DS2 each time the operation time of each process elapses.

Upon terminating the processing at Step S412, the user terminal 2 returns to the above-described monitoring loop processing.

6. Second Embodiment

In order to achieve operations of the assistant system in a second embodiment, an outline of processing executed by the user terminal 2 including the assistant application, the assistant server 3, and the providing server 1 will be described by referring to FIG. 16. The following attaches similar reference numerals to processing similar to that in the first embodiment, and their descriptions are omitted. The details of processing of the assistant server 3 are similar to those of the first embodiment, and their descriptions are omitted.

In the second embodiment, the providing server 1, in a state of transmitting each piece of process information of the requested cooking to the assistant server 3 at each predetermined time, causes the user terminal 2 to present alarm information when the process information cannot be transmitted to the assistant server 3 at Step S34 due to the disconnection of the communication session state at Step S32.

First, the providing server 1 transmits the third process information to the assistant server 3 at Step S34 after performing processing similar to that in the first embodiment. However, the communication session between the assistant application of the user terminal 2 and the assistant server 3 has already been disconnected at Step S32. Therefore, the providing server 1 cannot transmit the third process information to the assistant server 3.

In this case, the providing server 1 transmits the alarm information to the user terminal 2, and controls the user terminal 2 to present the alarm information at Step S40.

The user terminal 2 that received the alarm information performs activating processing to cause itself to recover from the sleep state at Step S45. The user terminal 2 displays letters to call for attention saying such as "Please confirm the cooking situation" in the speech bubble SP10 in FIG. 8B, and generates an alarm tone from the terminal at Step S41.

This ensures calling for attention of a user who fell asleep during cooking or a user who left the kitchen.

The providing server 1, when a predetermined time Ta elapses after transmitting the alarm information at Step S40, transmits the third process information to the assistant server 3 again at Step S42.

The providing server 1 transmits alarm information including audio data of an alarm tone having a sound volume larger than that in the previous time to the user terminal 2 at Step S43 when the third process information cannot be transmitted to the assistant server 3.

The user terminal 2 performs the activating processing to recover itself from the sleep state at Step S46, and displays the letters to call for attention in the speech bubble SP10 in FIG. 8B and generates the alarm tone larger than that in the previous time from the terminal at Step S44.

The providing server 1 transmits information including the alarm tone larger than that in the previous time to the user terminal 2 each time the predetermined time Ta elapses thereafter.

The predetermined time Ta may be a constant interval such as every three minutes, or may be set so as to get gradually shorter such as three minutes, two minutes, one minute . . . . The volume of the notifying alarm tones may be at an identical sound volume every time or may be set so as to get gradually smaller.

Next, processing by the providing server 1 in the predetermined information transmitting processing at Step S104 in FIG. 11 in the second embodiment will be described by referring to FIG. 17.

The providing server 1 transmits the n-th process information to the assistant server 3 at Step S201 and determines whether the transmission has succeeded at Step S202. When the transmission of the n-th process information to the assistant server 3 fails, the providing server 1 proceeds the processing from Step S202 to Step S210.

The providing server 1 transmits the alarm information to the user terminal 2 at Step S210. At Step S211, the providing server 1 controls the user terminal 2 to perform a presentation in accordance with this alarm information. This displays the letters to call for attention in the speech bubble SP10 on the lock screen DS3 in FIG. 8B in the user terminal 2, and the alarm tone is emitted from the terminal.

The providing server 1 starts measuring a time t(a) at Step S212. At Step S213, the providing server 1 stands by until the time t(a) becomes equal to or more than a threshold value Ta set in order to perform an alarm notification. The threshold value Ta is a value set in advance in order to notify the alarm.

The providing server 1 stands by until the time t(a) becomes equal to or more than the threshold value Ta at Step S213. When the time t(a) becomes equal to or more than the threshold value Ta at Step S213, the providing server 1 transmits the n-th process information to the assistant server 3 at Step S214, and determines whether the transmission has succeeded at Step S215.

When the transmission of the n-th process information to the assistant server 3 fails at Step S215, the state is a state where the communication session between the assistant application of the user terminal 2 and the assistant server 3 is not established. Therefore, it is considered that the user terminal 2 is still in the sleep state.

Therefore, the providing server 1 proceeds the processing from Step S215 to Step S216, and transmits the alarm information including the audio data of the alarm tone having the sound volume larger than that in the previous time to the user terminal 2. Then, the providing server 1 proceeds the processing to Step S211, and controls the user terminal 2 to perform the presentation in accordance with this alarm information.

The providing server 1 continuously executes the processing from Steps S211 to S216 until the transmission of the n-th process information succeeds at Step S215.

The providing server 1 can cancel the processing regarding the notification of the alarm tone in response to requests from the user terminal 2 and the assistant server 3.

The providing server 1, upon determining that the transmission of the n-th process information to the assistant server 3 has succeeded at Step S215, terminates the processing in FIG. 17, and proceeds the processing to Step S105 in FIG. 11.

Next, processing by the user terminal 2 in the second embodiment will be described by referring to FIG. 18. In the monitoring loop in FIG. 14, the user terminal 2 performs the processing of Steps S409→S420→S410 when the sleep condition is satisfied at Step S408. Thus, the user terminal 2 is controlled to go into the sleep state and the lock state, and the communication session between the user terminal 2 and the assistant server 3 is disconnected.

In FIG. 18, the processing by the user terminal 2 in the sleep state is executed. At this time, the user terminal 2 loops Steps S460→S454→S455 and performs monitoring after presenting the lock screen at Step S451.

The user terminal 2, upon receiving the alarm information from the providing server 1 at Step S460, performs the activating processing to recover itself from the sleep state. The user terminal 2 generates the alarm tone from the terminal in accordance with the alarm information received at Step S453.

The user terminal 2 can also display the letters to call for attention saying such as "Please confirm the cooking situation" in the speech bubble SP10, for example, as illustrated in FIG. 8B when the alarm tone is generated.

Upon terminating the processing at Step S453, the user terminal 2 returns to the above-described monitoring loop processing.

The processing of the user terminal 2 at Steps S454 and S455 is processing similar to that in the first embodiment, and therefore, its description is omitted.

7. Summary and Modification

The providing server 1 described in the above-described embodiments and the like includes a request data receiving unit 11 that receives a processing request from a mediating unit (assistant server 3), a guide information obtaining unit 12 that obtains guide information (cooking information) including a plurality of pieces of process information in accordance with the process request, and an information transmitting unit 13 that intermittently and sequentially transmits the plurality of pieces of process information and, in a case where a communication session between a terminal device (user terminal 2) and the mediating unit (assistant server 3) is disconnected before transmission of all the process information in the guide information (cooking information) is completed, transmits information for executing an output in accordance with a transmission situation of the plurality of pieces of process information when the communication session is disconnected to the terminal device (user terminal 2). The providing server 1 intermittently and sequentially transmits the plurality of pieces of process information to the mediating unit (assistant server 3) in a state where the communication session between the user terminal 2 and the assistant server 3 is established.

This transmits the information from the providing server 1 to the user terminal 2 even when the communication session between the user terminal 2 and the assistant server 3 is disconnected in its course.

The user terminal 2 going into the sleep state interrupts the processing by the assistant application, and disconnects the communication session between the user terminal 2 including the assistant application and the assistant server 3. Therefore, the providing server 1 can no longer transmit the process information of the cooking to the user terminal 2 via the assistant server 3. Accordingly, each piece of process information of the cooking can no longer be continuously notified to the user. Even in such a case, information, such as the process information, can be continuously provided to the user. That is, the information such as a guide along time series can be presented even when the user terminal 2 goes into the sleep state due to a lapse of time.

The user has to manually operate to release the sleep state and the lock state of the user terminal 2 in order to obtain the subsequent information when the user terminal 2 goes into the sleep state. Then, the assistant application and the like is activated to establish the communication session with the assistant server 3 again, and the recipe information of the food that has been cooked is requested from the assistant application side again. However, despite the suggestion of the food that the user desires to cook itself has already been finished, it is inconvenient for the user that the user has to communicate with the assistant application side as illustrated in FIG. 5A.

In such a case, it is convenient for the user in operation that the user can visually or aurally grasp the process information of the cooking without touching the user terminal 2.

While in the embodiment, the providing server 1 and the assistant server 3 are described as different information processing devices, the providing server 1 and the assistant server 3 may be formed as one information processing device. That is, the information processing device as the providing server 1 in the embodiment may have a function of the assistant server 3.

It is considered that the providing server 1 transmits the predetermined information such as the process information or the alarm information, that is, the information for executing the output in accordance with the transmission situation of the plurality of pieces of process information as the information that can be presented by voice to the user terminal 2.

In view of this, regardless of whether the predetermined information is presented on the presentation screen of the user terminal 2 or not, this information can be notified. Here, the alarm information may be the notification by sound, and various notification aspects, such as a vibration and a light emission, in order to cause the user using the terminal device to pay attention are considered.

The user who is cooking a food has a demand that the user hesitates to touch the user terminal 2 when performing operations of sleep release and similar operation from the aspect of good hygiene and hesitation of contaminating the terminal.

Therefore, aurally grasping the process information of the cooking without touching the user terminal 2 leads to an improvement of convenience for the user in operation.

There are cases where a fire and the like are handled and processes in which a timing is important during cooking. Accordingly, there are many cases where the user cannot afford to constantly look at the screen of the user terminal 2. Therefore, aurally receiving the information, such as the process of cooking, directly leads to the improvement of the convenience for the user.

Making the aural recognition of the process information possible also has a practical benefit for people with visual impairments.

The predetermined information is the process information, and it is considered that, when the estimated time of the transmitted process information elapses, the providing server 1 transmits the next process information to the assistant server 3 in the state where the communication session is established, and transmits the next process information to the user terminal 2 in the state where the communication session is disconnected.

This ensures continuously transmitting the process information to the user terminal 2 from the providing server 1 even when the communication session between the user terminal 2 and the assistant server 3 is disconnected in its course. That is, the user can grasp the process information of the cooking without touching the user terminal 2.

It is considered that the providing server 1 transmits the process information to the user terminal 2 as a push notification in a state where the communication session is disconnected.

This enables to present the process information even when the user terminal 2 is, for example, on the lock screen. That is, the subsequent process information can be continuously confirmed even without the user operating to release the lock screen of the user terminal 2.

It is considered that the predetermined information, that is, the information for executing the output in accordance with the transmission situation of the plurality of pieces of the process information is the activation request information of the user terminal 2.

In the state where the communication session between the user terminal 2 and the assistant server 3 is disconnected in its course, the user terminal 2 is considered to be in the sleep state. Therefore, transmitting the activation request information of the user terminal 2 when the information is transmitted from the providing server 1 to the user terminal 2 ensures receiving the information while releasing the sleep state.

That is, even when the user terminal 2 is in the sleep state, the sleep state can be automatically released and the subsequent process information can be continuously confirmed. This ensures keeping the user terminal 2 in the sleep state except for when the user terminal 2 notifies the process information. Accordingly, a battery of the user terminal 2 can be saved.

The predetermined information, that is, the information for executing the output in accordance with the transmission situation of the plurality of pieces of process information is the alarm information, and it is considered that the providing server 1 transmits the alarm information to the user terminal 2 in the case where the communication session is in a disconnected state when the estimated time of the process information transmitted in the state where the communication session is established elapses. In view of this, notifying the lapse of the predetermined time for the process information calls the user of the user terminal 2 for attention.

There are cases where it takes a long time until a navigation of the next process among the processes, for example, it takes 20 minutes to stew. In this case, it is possible that the user who is in the middle of cooking falls asleep or leaves the kitchen. In such a case, the fact that the process has passed can be informed to the user with the alarm tone.

The information of the elapsed time and similar information may be transmitted as the predetermined information not only the alarm information.

It is considered that the providing server 1 transmits the alarm information to the user terminal 2 again when the communication session is in the disconnected state after the predetermined time elapsed after the alarm information was transmitted to the user terminal 2.

This periodically and continuously calls for attention by the alarm until the user notices. This ensures further effectively calling the user in the middle of cooking for attention.

It is considered that the providing server 1 transmits the alarm information to the user terminal 2. The alarm information causes sound to be produced with a larger volume in accordance with an increase in a transmitting number of the alarm information to the user terminal 2.

This makes it further easy to make the user recognize a situation of the user terminal 2 by alarm tone. This ensures yet further effectively calling the user in the middle of cooking for attention.

It is considered that the providing server 1 determines the state of the communication session between the user terminal 2 and the assistant server 3 depending on whether the transmission of the process information to the user terminal 2 has succeeded or not.

This ensures determining the state of the communication session between the user terminal 2 and the assistant server 3 based on whether the transmission of the process information to the assistant server 3 has succeeded or not without performing the processing to confirm a state of the communication session again. Accordingly, an improvement in efficiency of communication and a reduction of a communication capacity can be achieved by the reduction of the communication processing number.

While in the embodiment, the cooking has been used as an example of a content and described as the assistant system for, for example, the process information of the cooking, the content here is not limited to the cooking. A length and a content of the content are not particularly limited as long as the content is information, such as a text, a diagram, an image, and an audio, regarding a predetermined matter. The content, for example, includes an advertisement, news, a review, and a blog.

For the guide information provided in this assistant system is not limited to the cooking process, and information including various procedures, such as information for each path in road navigation, a producing procedure of a craft work, and a sponsor for each piece of news information of newly arrived news information, is considered.

The processing described for the embodiments may be processing each of them is independent, or can be performed by combining each of the processing. Various aspects besides the above-described examples are considered as the combinations of the embodiment.

8. Program and Storage Medium

The providing server 1 as the embodiment of the information processing device according to the embodiment has been described above, a program of the embodiment is a program that causes the information processing device (for example, CPU) to execute each processing in the providing server 1.

The program of the embodiment is a program that causes an information processing device to execute functions. The information processing device is in a system in which, in a state where a communication session between a terminal device and a mediating unit is established, the information processing device transmits information in accordance with a processing request so that an output based on the transmitted information is performed in the terminal device. The processing request is generated by the mediating unit based on input data of the terminal device. The information processing device is caused to execute a request data receiving function that receives the processing request from the mediating unit, a guide information obtaining function that obtains guide information in accordance with the processing request, the guide information including a plurality of pieces of process information, and an information transmission function that intermittently and sequentially transmits the plurality of pieces of process information and, in a case where the communication session is disconnected before transmission of all the process information in the guide information is completed, transmits, to the terminal device, information for executing an output in accordance with a transmission situation of the plurality of pieces of process information when the communication session is disconnected.

Such a program ensures achieving the information processing device as the above-described providing server 1.

Such a program can be stored in advance in an HDD as a storage medium incorporated in a device, such as a computer device, and a ROM in a microcomputer including the CPU. Alternatively, such a program can be temporarily or permanently stored (memorized) in a removable storage medium, such as a semiconductor memory, a memory card, an optical disk, a magnet-optical disk, and a magnetic disk. Such a removable storage medium can be provided as, what is called, package software.

Such a program can be downloaded from a download website through a network, such as LAN and the internet, besides installing from the removable storage medium into, for example, a personal computer.

Lastly, the description of each of the above-described embodiments is one example of the present technique, and the present technique is not limited to the above-described embodiments. In view of this, even it is different from each of the above-described embodiments, it is obvious that various kinds of changes are possible in accordance with, for example, the design as long as it falls within a range without departing from the technical idea of the present technique.

REFERENCE SIGNS LIST 1 providing server
2 user terminal
3 assistant server
4 content DB
11 request data receiving unit
12 guide information obtaining unit
13 information transmitting unit

The invention claimed is:

1. An information processing device in a system in which, in a state where a communication session between a terminal device and a mediating server is established, the information processing device transmits information in accordance with a processing request so that an output based on the transmitted information is performed in the terminal device, the processing request being generated by the mediating server based on input data of the terminal device, the information processing device comprising:
at least one memory configured to store computer program code;
at least one processor configured to access the computer program code and operate as instructed by the computer program code, the computer program code including:
request data receiving code configured to cause the at least one processor to receive the processing request from the mediating server;
guide information obtaining code configured to cause the at least one processor to obtain guide information in accordance with the processing request, the guide information including a plurality of pieces of process information; and
information transmitting code configured to cause the at least one processor to intermittently and sequentially transmit the plurality of pieces of process information and, when the communication session is disconnected from the mediating server before transmission of all of the plurality of pieces of process information in the guide information is completed, transmit, directly to the terminal device based on an elapse of a time estimated for each transmitted piece of process information, information for executing an output in accordance with a transmission situation of the plurality of pieces of process information at a time when the communication session is disconnected.

2. The information processing device according to claim 1, wherein
the information transmitting code is configured to cause the at least one processor to intermittently and sequentially transmit the plurality of pieces of process information to the mediating server in a state where the communication session is established.

3. The information processing device according to claim 1, wherein
the information for executing the output is at least one of the plurality of pieces of process information, and
the information transmitting code causes the at least one processor to, based on the elapse of a time estimated for each transmitted piece of process information, transmit a next piece of process information to the mediating server in a state where the communication session is established, and transmit the next piece of process information to the terminal device in a state where the communication session is disconnected.

4. The information processing device according to claim 3, wherein
the information transmitting code is configured to cause the at least one processor to transmit the next piece of process information to the terminal device as a push notification in a state where the communication session is disconnected.

5. The information processing device according to claim 1, wherein
the information transmitting code is configured to cause the at least one processor to transmit, to the terminal device, the information for executing the output as information configured to be output by voice.

6. The information processing device according to claim 1, wherein
the information for executing the output is activation request information of the terminal device.

7. The information processing device according to claim 6, wherein
the information for executing the output is alarm information, and
the information transmitting code is configured to cause the at least one processor to, based on the elapse of a time estimated for each piece of process information transmitted in a state where the communication session is established, and further based on the communication session being in a disconnected state, transmit the alarm information to the terminal device.

8. The information processing device according to claim 7, wherein
the information transmitting code is configured to cause the at least one processor to, based on the communication session being in the disconnected state, and further based on an elapse of a predetermined time after transmitting the alarm information to the terminal device, transmit the alarm information to the terminal device again.

9. The information processing device according to claim 7, wherein
the information transmitting code is configured to cause the at least one processor to transmit the alarm information to the terminal device, the alarm information causing sound to be produced with a larger volume in accordance with an increase in a transmitting number of the alarm information to the terminal device.

10. The information processing device according to claim 1, wherein
the information transmitting code is configured to cause the at least one processor to determine a state of the communication session depending on whether transmission of the plurality of pieces of process information to the mediating server has succeeded or not.

11. An information processing method performed by an information processing device including at least one processor, the information processing device being in a system in which, in a state where a communication session between a terminal device and a mediating server is established, the information processing device transmits information in accordance with a processing request so that an output based on the transmitted information is performed in the terminal device, the processing request being generated by the mediating server based on input data of the terminal device;

receiving the processing request from the mediating server;

obtaining guide information in accordance with the processing request, the guide information including a plurality of pieces of process information; and intermittently and sequentially transmitting the plurality of pieces of process information and, when the communication session is disconnected from the mediating server before transmission of all of the plurality of pieces of process information in the guide information is completed, transmitting, directly to the terminal device based on an elapse of a time estimated for each transmitted piece of process information, information for executing an output in accordance with a transmission situation of the plurality of pieces of process information at a time when the communication session is disconnected.

12. A non-transitory computer-readable storage medium that stores a program that causes an information processing device to perform operations, the information processing device being in a system in which, in a state where a communication session between a terminal device and a mediating server is established, the information processing device transmits information in accordance with a processing request so that an output based on the transmitted information is performed in the terminal device, the processing request being generated by the mediating server based on input data of the terminal device, the information processing device is caused to:

receive the processing request from the mediating server;

obtain guide information in accordance with the processing request, the guide information including a plurality of pieces of process information; and intermittently and sequentially transmit the plurality of pieces of process information and, when the communication session is disconnected from the mediating server before transmission of all of the plurality of pieces of process information in the guide information is completed, transmit, directly to the terminal device based on an elapse of a time estimated for each transmitted piece of process information, information for executing an output in accordance with a transmission situation of the plurality of pieces of process information at a time when the communication session is disconnected.

* * * * *